US008750292B2

(12) United States Patent
Agarwal et al.

(10) Patent No.: US 8,750,292 B2
(45) Date of Patent: Jun. 10, 2014

(54) SYSTEMS, METHODS, AND COMPUTER READABLE MEDIA FOR USING A SIGNALING MESSAGE ROUTING NODE TO PROVIDE BACKUP SUBSCRIBER INFORMATION MANAGEMENT SERVICE

(75) Inventors: Devesh Agarwal, Raleigh, NC (US); Carlos Alberto Schifferli Lopes, Bellevue, WA (US); Allyson Sharp, Garland, TX (US); Peter Joseph Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 0 days.

(21) Appl. No.: 13/035,656

(22) Filed: Feb. 25, 2011

(65) Prior Publication Data

US 2011/0211527 A1  Sep. 1, 2011

Related U.S. Application Data

(60) Provisional application No. 61/308,280, filed on Feb. 25, 2010.

(51) Int. Cl.
*H04L 12/66* (2006.01)
(52) U.S. Cl.
USPC .......................................... 370/353; 370/356
(58) Field of Classification Search
USPC ............... 370/328, 352, 353, 356, 389, 395.2
See application file for complete search history.

(56) References Cited

U.S. PATENT DOCUMENTS

| | | |
|---|---|---|
| 4,310,727 A | 1/1982 | Lawser |
| 4,754,479 A | 6/1988 | Bicknell et al. |
| 5,089,954 A | 2/1992 | Rago |
| 5,237,604 A | 8/1993 | Ryan |
| 5,247,571 A | 9/1993 | Kay et al. |

(Continued)

FOREIGN PATENT DOCUMENTS

| | | |
|---|---|---|
| CN | ZL200680051295.9 | 3/2013 |
| EP | 0 512 962 A2 | 11/1992 |

(Continued)

OTHER PUBLICATIONS

Notification of Transmittal of the International Search Report and the Written Opinion of the International Searching Authority, or the Declaration for International Application No. PCT/US2011/026307 (Nov. 15, 2011).

(Continued)

*Primary Examiner* — Brian O'Connor
(74) *Attorney, Agent, or Firm* — Jenkins, Wilson, Taylor & Hunt, P.A.

(57) ABSTRACT

Methods, systems, and computer readable media for using a signaling message routing node to provide a backup subscriber information management service are disclosed. According to one method, a signaling message routing node obtains information associated with a subscriber. The signaling message routing node receives a first subscriber information management message including a message destination and being associated with the subscriber. The signaling message routing node determines whether the message destination is operable to process the first subscriber information management message. If the message destination node is operable to process the first subscriber information management message, the signaling message routing node routes the first subscriber information message to the message destination. If the message destination is not operable to process the first subscriber information management message, the signaling message routing node responds to the first subscriber information management message on behalf of the message destination.

35 Claims, 11 Drawing Sheets

(56) References Cited

U.S. PATENT DOCUMENTS

| | | | |
|---|---|---|---|
| 5,251,248 A | 10/1993 | Tokunaga et al. | |
| 5,400,390 A | 3/1995 | Salin | |
| 5,420,916 A | 5/1995 | Sekiguchi | |
| 5,422,941 A | 6/1995 | Hasenauer et al. | |
| 5,423,068 A | 6/1995 | Hecker | |
| 5,430,719 A | 7/1995 | Weisser, Jr. | |
| 5,442,683 A | 8/1995 | Hoogeveen | |
| 5,455,855 A | 10/1995 | Hokari | |
| 5,457,736 A | 10/1995 | Cain et al. | |
| 5,475,732 A | 12/1995 | Pester, III | |
| 5,481,603 A | 1/1996 | Gutierrez et al. | |
| 5,502,726 A | 3/1996 | Fischer | |
| 5,504,804 A | 4/1996 | Widmark et al. | |
| 5,526,400 A | 6/1996 | Nguyen | |
| 5,579,372 A | 11/1996 | Åström | |
| 5,590,398 A | 12/1996 | Matthews | |
| 5,594,942 A | 1/1997 | Antic et al. | |
| 5,623,532 A | 4/1997 | Houde et al. | |
| 5,689,548 A | 11/1997 | Maupin et al. | |
| 5,706,286 A | 1/1998 | Reiman et al. | |
| 5,711,002 A | 1/1998 | Foti | |
| 5,812,639 A | 9/1998 | Bartholomew et al. | |
| 5,819,178 A | 10/1998 | Cropper | |
| 5,822,694 A | 10/1998 | Coombes et al. | |
| 5,832,382 A | 11/1998 | Alperovich | |
| 5,841,854 A | 11/1998 | Schumacher et al. | |
| 5,852,660 A | 12/1998 | Lindquist et al. | |
| 5,854,982 A | 12/1998 | Chambers et al. | |
| 5,862,481 A | 1/1999 | Kulkarni et al. | |
| 5,867,788 A | 2/1999 | Joensuu | |
| 5,878,347 A | 3/1999 | Joensuu et al. | |
| 5,878,348 A | 3/1999 | Foti | |
| 5,889,849 A | 3/1999 | Ban et al. | |
| 5,890,063 A | 3/1999 | Mills | |
| 5,953,662 A | 9/1999 | Lindquist et al. | |
| 5,953,663 A | 9/1999 | Maupin et al. | |
| 5,983,217 A | 11/1999 | Khosravi-Sichannie et al. | |
| 6,006,098 A | 12/1999 | Rathnasabapathy et al. | |
| 6,011,803 A | 1/2000 | Bicknell et al. | |
| 6,014,557 A | 1/2000 | Morton et al. | |
| 6,018,657 A | 1/2000 | Kennedy, III et al. | |
| 6,038,456 A | 3/2000 | Colby et al. | |
| 6,049,714 A | 4/2000 | Patel | |
| 6,094,578 A | 7/2000 | Purcell et al. | |
| 6,097,960 A | 8/2000 | Rathnasabapathy et al. | |
| 6,115,463 A | 9/2000 | Coulombe et al. | |
| H1895 H | 10/2000 | Hoffpauir et al. | |
| 6,128,377 A | 10/2000 | Sonnenberg | |
| 6,134,441 A | 10/2000 | Åström et al. | |
| 6,134,447 A * | 10/2000 | Havinis et al. | 455/456.6 |
| 6,137,806 A | 10/2000 | Martinez | |
| 6,138,007 A | 10/2000 | Bharatia | |
| 6,138,016 A | 10/2000 | Kulkarni et al. | |
| 6,138,017 A | 10/2000 | Price et al. | |
| 6,138,023 A | 10/2000 | Agarwal et al. | |
| 6,144,857 A | 11/2000 | Price et al. | |
| 6,148,204 A | 11/2000 | Urs et al. | |
| 6,175,743 B1 | 1/2001 | Alperovich et al. | |
| 6,178,181 B1 | 1/2001 | Glitho | |
| 6,192,242 B1 | 2/2001 | Rollender | |
| 6,205,210 B1 | 3/2001 | Rainey et al. | |
| 6,208,870 B1 | 3/2001 | Lorello et al. | |
| 6,226,517 B1 | 5/2001 | Britt et al. | |
| 6,236,365 B1 | 5/2001 | LeBlanc et al. | |
| 6,263,212 B1 | 7/2001 | Ross et al. | |
| 6,292,669 B1 | 9/2001 | Meuronen et al. | |
| 6,298,232 B1 | 10/2001 | Marin et al. | |
| 6,308,075 B1 | 10/2001 | Irten et al. | |
| 6,324,279 B1 | 11/2001 | Kalmanek et al. | |
| 6,327,350 B1 | 12/2001 | Spangler et al. | |
| 6,338,140 B1 | 1/2002 | Owens et al. | |
| 6,356,529 B1 | 3/2002 | Zarom | |
| 6,363,431 B1 | 3/2002 | Hammer et al. | |
| 6,377,674 B1 | 4/2002 | Chong et al. | |
| 6,377,807 B1 | 4/2002 | Iparrea et al. | |
| 6,411,632 B2 | 6/2002 | Lindgren et al. | |
| 6,421,674 B1 | 7/2002 | Yoakum et al. | |
| 6,424,832 B1 | 7/2002 | Britt et al. | |
| 6,434,127 B1 | 8/2002 | Ha | |
| 6,453,174 B1 | 9/2002 | Cunningham et al. | |
| 6,463,055 B1 | 10/2002 | Lupien et al. | |
| 6,493,551 B1 | 12/2002 | Wang et al. | |
| 6,505,046 B1 | 1/2003 | Baker | |
| 6,512,926 B1 | 1/2003 | Henry-Labordere | |
| 6,515,997 B1 | 2/2003 | Feltner et al. | |
| 6,519,242 B1 | 2/2003 | Emery et al. | |
| 6,519,468 B1 | 2/2003 | Donovan et al. | |
| 6,529,524 B1 | 3/2003 | Liao et al. | |
| 6,535,746 B1 | 3/2003 | Yu et al. | |
| 6,560,216 B1 | 5/2003 | McNiff et al. | |
| 6,560,456 B1 | 5/2003 | Lohtia et al. | |
| 6,574,481 B1 | 6/2003 | Rathnasabapathy et al. | |
| 6,577,723 B1 | 6/2003 | Mooney | |
| 6,594,258 B1 | 7/2003 | Larson et al. | |
| 6,611,516 B1 | 8/2003 | Pirkola et al. | |
| 6,615,037 B1 | 9/2003 | Bharatia et al. | |
| 6,625,461 B1 | 9/2003 | Bertacchi | |
| 6,643,511 B1 | 11/2003 | Rune et al. | |
| 6,662,017 B2 * | 12/2003 | McCann et al. | 455/461 |
| 6,683,881 B1 | 1/2004 | Mijares et al. | |
| 6,684,073 B1 | 1/2004 | Joss et al. | |
| 6,697,620 B1 | 2/2004 | Lamb et al. | |
| 6,731,926 B1 | 5/2004 | Link, II et al. | |
| 6,738,636 B2 | 5/2004 | Lielbriedis | |
| 6,745,041 B2 | 6/2004 | Allison et al. | |
| 6,795,701 B1 | 9/2004 | Baker et al. | |
| 6,801,781 B1 | 10/2004 | Provost et al. | |
| 6,819,932 B2 | 11/2004 | Allison et al. | |
| 6,826,397 B1 | 11/2004 | Vasa | |
| 6,836,477 B1 | 12/2004 | West, Jr. et al. | |
| 6,850,768 B2 | 2/2005 | Foll | |
| 6,865,191 B1 | 3/2005 | Bengtsson et al. | |
| 6,885,872 B2 | 4/2005 | McCann et al. | |
| 6,912,389 B2 | 6/2005 | Bright et al. | |
| 6,917,612 B2 | 7/2005 | Foti et al. | |
| 6,950,441 B1 | 9/2005 | Kaczmarczyk et al. | |
| 6,993,038 B2 | 1/2006 | McCann | |
| 7,035,239 B2 | 4/2006 | McCann et al. | |
| 7,039,037 B2 | 5/2006 | Wang et al. | |
| 7,043,002 B2 | 5/2006 | Delaney et al. | |
| 7,079,524 B2 | 7/2006 | Bantukul et al. | |
| 7,079,853 B2 | 7/2006 | Rathnasabapathy et al. | |
| 7,092,505 B2 | 8/2006 | Allison et al. | |
| 7,113,795 B2 * | 9/2006 | Somani et al. | 455/456.1 |
| 7,113,800 B2 | 9/2006 | Linkola | |
| 7,145,875 B2 | 12/2006 | Allison et al. | |
| 7,177,398 B2 * | 2/2007 | Meer et al. | 379/45 |
| 7,177,399 B2 * | 2/2007 | Dawson et al. | 379/45 |
| 7,181,194 B2 | 2/2007 | McCann et al. | |
| 7,190,959 B2 | 3/2007 | Palmer et al. | |
| 7,221,929 B2 * | 5/2007 | Lee et al. | 455/408 |
| 7,221,952 B2 | 5/2007 | Cho et al. | |
| 7,257,401 B1 | 8/2007 | Dizdarevic et al. | |
| 7,274,683 B2 | 9/2007 | Segal | |
| 7,286,839 B2 * | 10/2007 | McCann et al. | 455/461 |
| 7,292,592 B2 * | 11/2007 | Rune | 370/401 |
| 7,366,945 B2 * | 4/2008 | Wang et al. | 714/4.11 |
| 7,397,773 B2 | 7/2008 | Qu et al. | |
| 7,453,876 B2 * | 11/2008 | Hua et al. | 370/392 |
| 7,551,608 B1 | 6/2009 | Roy | |
| 7,583,646 B2 * | 9/2009 | Hua et al. | 370/338 |
| 7,627,331 B2 * | 12/2009 | Winterbottom et al. | 455/456.1 |
| 7,668,543 B2 * | 2/2010 | Muller | 455/433 |
| 7,729,485 B2 | 6/2010 | Koskinen et al. | |
| 7,746,864 B1 | 6/2010 | Asawa et al. | |
| 7,801,116 B2 * | 9/2010 | Westman | 370/352 |
| 7,844,745 B1 * | 11/2010 | Darbyshire et al. | 710/3 |
| 7,848,767 B2 | 12/2010 | McCann et al. | |
| 7,889,716 B2 | 2/2011 | Tejani et al. | |
| 7,894,353 B2 * | 2/2011 | Li et al. | 370/248 |
| 7,916,857 B2 * | 3/2011 | Palmer et al. | 379/229 |
| 7,962,120 B2 * | 6/2011 | Cai et al. | 455/406 |
| 8,041,349 B2 * | 10/2011 | Fukui et al. | 455/422.1 |
| 8,175,236 B2 * | 5/2012 | Pandey et al. | 379/114.2 |

(56) References Cited

U.S. PATENT DOCUMENTS

| | | | |
|---|---|---|---|
| 8,194,634 B2* | 6/2012 | Delker et al. | 370/338 |
| 8,195,161 B2* | 6/2012 | Bumiller | 455/435.1 |
| 8,208,461 B2* | 6/2012 | Mitchell | 370/352 |
| 8,380,209 B1* | 2/2013 | Sylvain | 455/445 |
| 8,391,833 B2* | 3/2013 | Agarwal | 455/406 |
| 2001/0006897 A1 | 7/2001 | Kang et al. | |
| 2001/0029182 A1 | 10/2001 | McCann et al. | |
| 2001/0030957 A1 | 10/2001 | McCann et al. | |
| 2001/0040957 A1 | 11/2001 | McCann et al. | |
| 2001/0046856 A1 | 11/2001 | McCann | |
| 2002/0132636 A1 | 9/2002 | Stockhusen | |
| 2002/0147845 A1 | 10/2002 | Sanchez-Herrero et al. | |
| 2002/0173320 A1 | 11/2002 | Aitken et al. | |
| 2002/0176382 A1 | 11/2002 | Madour et al. | |
| 2003/0003930 A1 | 1/2003 | Allison et al. | |
| 2003/0007482 A1 | 1/2003 | Khello et al. | |
| 2003/0016684 A1 | 1/2003 | Prasad et al. | |
| 2003/0026289 A1 | 2/2003 | Mukherjee et al. | |
| 2003/0054844 A1 | 3/2003 | Anvekar et al. | |
| 2003/0061234 A1 | 3/2003 | Ali et al. | |
| 2003/0065788 A1 | 4/2003 | Salomaki | |
| 2003/0081754 A1 | 5/2003 | Esparza et al. | |
| 2003/0109271 A1 | 6/2003 | Lewis et al. | |
| 2003/0157938 A1 | 8/2003 | Haase et al. | |
| 2003/0193967 A1 | 10/2003 | Fenton et al. | |
| 2003/0227899 A1 | 12/2003 | McCann | |
| 2004/0076126 A1 | 4/2004 | Qu et al. | |
| 2004/0081206 A1 | 4/2004 | Allison et al. | |
| 2004/0082332 A1 | 4/2004 | McCann et al. | |
| 2004/0087300 A1 | 5/2004 | Lewis | |
| 2004/0125925 A1 | 7/2004 | Marsot | |
| 2004/0132451 A1 | 7/2004 | Butehorn et al. | |
| 2004/0142707 A1 | 7/2004 | Midkiff et al. | |
| 2004/0198351 A1 | 10/2004 | Knotts | |
| 2004/0202187 A1 | 10/2004 | Kelly et al. | |
| 2004/0203914 A1 | 10/2004 | Kall et al. | |
| 2004/0219935 A1 | 11/2004 | McCann et al. | |
| 2004/0246965 A1 | 12/2004 | Westman et al. | |
| 2004/0264674 A1 | 12/2004 | Delaney et al. | |
| 2005/0003838 A1 | 1/2005 | McCann et al. | |
| 2005/0111641 A1 | 5/2005 | Koskinen et al. | |
| 2005/0119017 A1 | 6/2005 | Lovell, Jr. et al. | |
| 2005/0238048 A1 | 10/2005 | Delaney et al. | |
| 2006/0034256 A1 | 2/2006 | Addagatla et al. | |
| 2006/0067338 A1 | 3/2006 | Hua et al. | |
| 2006/0098621 A1 | 5/2006 | Plata et al. | |
| 2006/0136557 A1 | 6/2006 | Schaedler et al. | |
| 2006/0281492 A1 | 12/2006 | Jiang | |
| 2007/0061397 A1 | 3/2007 | Gregorat et al. | |
| 2007/0066326 A1 | 3/2007 | Agarwal et al. | |
| 2007/0104184 A1 | 5/2007 | Ku et al. | |
| 2007/0133574 A1 | 6/2007 | Tejani et al. | |
| 2007/0209061 A1* | 9/2007 | Dekeyzer et al. | 726/3 |
| 2007/0254681 A1 | 11/2007 | Horvath et al. | |
| 2007/0258575 A1 | 11/2007 | Douglas et al. | |
| 2007/0288655 A1 | 12/2007 | Price et al. | |
| 2007/0297419 A1 | 12/2007 | Askerup et al. | |
| 2008/0039104 A1 | 2/2008 | Gu et al. | |
| 2008/0176538 A1* | 7/2008 | Terrill et al. | 455/414.1 |
| 2008/0233931 A1 | 9/2008 | Shim | |
| 2008/0248820 A1 | 10/2008 | Lohtia | |
| 2009/0003388 A1 | 1/2009 | Florkey et al. | |
| 2009/0129372 A1* | 5/2009 | Pandey et al. | 370/352 |
| 2009/0227276 A1 | 9/2009 | Agarwal et al. | |
| 2009/0232011 A1 | 9/2009 | Li et al. | |
| 2010/0113016 A1 | 5/2010 | Gayde et al. | |
| 2010/0217858 A1 | 8/2010 | Przybysz et al. | |
| 2010/0250662 A1 | 9/2010 | Agarwal et al. | |
| 2010/0278041 A1* | 11/2010 | Shi | 370/225 |
| 2010/0299451 A1* | 11/2010 | Yigang et al. | 709/241 |
| 2011/0067085 A1* | 3/2011 | Brouard et al. | 726/1 |
| 2011/0222532 A1 | 9/2011 | Noldus | |
| 2012/0034900 A1 | 2/2012 | Agarwal | |
| 2012/0163297 A1 | 6/2012 | Agarwal et al. | |
| 2012/0202550 A1 | 8/2012 | Marsico | |
| 2012/0224524 A1 | 9/2012 | Marsico | |
| 2012/0287844 A1 | 11/2012 | Ophir et al. | |
| 2013/0157620 A1 | 6/2013 | Marsico | |

FOREIGN PATENT DOCUMENTS

| | | |
|---|---|---|
| EP | 0 788 283 A2 | 8/1997 |
| EP | 0 936 825 A3 | 8/1999 |
| EP | 0 944 276 A1 | 9/1999 |
| EP | 1 558 004 A | 7/2005 |
| EP | 1 742 452 A1 | 1/2007 |
| EP | 1 950 942 A1 | 7/2008 |
| KR | 10-2004-0107271 A | 12/2004 |
| WO | WO 95/12292 A1 | 5/1995 |
| WO | WO 96/11557 | 4/1996 |
| WO | WO 97/33441 A1 | 9/1997 |
| WO | WO 98/56195 | 12/1998 |
| WO | WO 99/11087 A2 | 3/1999 |
| WO | WO 99/57926 | 11/1999 |
| WO | WO 00/16583 A1 | 3/2000 |
| WO | WO 01/47297 A2 | 6/2001 |
| WO | WO 01/48981 A1 | 7/2001 |
| WO | WO 01/54444 A1 | 7/2001 |
| WO | WO 02/060192 A2 | 8/2002 |
| WO | WO 03/005664 A2 | 1/2003 |
| WO | WO 03/021982 A1 | 3/2003 |
| WO | WO 03/105382 A1 | 12/2003 |
| WO | WO 2004/006534 | 1/2004 |
| WO | WO 2004/008786 A1 | 1/2004 |
| WO | WO 2004/075507 | 9/2004 |
| WO | WO 2004/102345 A2 | 11/2004 |
| WO | WO 2005/002311 A2 | 1/2005 |
| WO | WO 2005/013538 A3 | 2/2005 |
| WO | WO 2006/072473 A1 | 7/2006 |
| WO | WO 2007/045991 A1 | 4/2007 |
| WO | WO 2007/064943 A2 | 6/2007 |
| WO | WO 2007/092205 A2 | 8/2007 |
| WO | WO 2007/146257 A2 | 12/2007 |
| WO | WO 2008/157213 A2 | 12/2008 |
| WO | WO 2009/023573 A2 | 2/2009 |
| WO | WO 2010/111561 A2 | 9/2010 |
| WO | WO 2012/088497 A1 | 6/2012 |

OTHER PUBLICATIONS

Communication under Rule 71(3) EPC for European Application No. 06 844 747.3 (Jul. 19, 2011).

Chinese Official Action for Chinese Patent Application No. 200680051295.9 (Dec. 24, 2010).

Notification of Transmittal of the Ininternational Search Report and the Written Opinion of the International Searching Authority, or the Declaration for International Application No. PCT/US2010/028762 (Oct. 27, 2010).

Notice of Allowance and Fee(s) Due for U.S. Appl. No. 11/291,502 (Oct. 5, 2010).

Notice of Allowance and Fee(s) Due for U.S. Appl. No. 10/405,859 (Aug. 5, 2010).

Notice of Allowance and Fee(s) Due for U.S. Appl. No. 11/706,837 (May 27, 2010).

Communication Pursuant to Article 94(3) EPC for European Application No. 06844747.3 (May 11, 2010).

Notice of Allowance and Fee(s) Due for U.S. Appl. No. 10/405,859 (Mar. 9, 2010).

Final Official Action for U.S. Appl. No. 11/291,502 (Feb. 4, 2010).

"Diameter (Protocol)," Wikipedia, pp. 1-8 (Document last modified on Jan. 16, 2010).

Final Official Action for U.S. Appl. No. 11/706,837 (Dec. 15, 2009).

Interview Summary for U.S. Appl. No. 11/706,837 (Oct. 26, 2009).

Official Action for U.S. Appl. No. 10/405,859 (Aug. 3, 2009).

Communication pursuant to Article 94(3) EPC for European application No. 06844747.3 (Jul. 28, 2009).

Official Action for U.S. Appl. No. 11/706,837 (May 13, 2009).

Official Action for U.S. Appl. No. 11/291,502 (May 13, 2009).

Supplementary European Search Report for European Application No. 06844747.3 (Apr. 24, 2009).

Final Official Action for U.S. Appl. No. 10/405,859 (Jan. 6, 2009).

(56) References Cited

OTHER PUBLICATIONS

3GPP, "Digital Cellular Telecommunications System (Phase 2+); Universal Mobile Telecommunications System (UMTS); LTE; IP Multimedia (IM) Subsystem Cx and Dx Interfaces; Signalling Flows and Message Contents," ETSI TS 129 228 V8.4.0 (Jan. 2009).
Notification Concerning Transmittal of International Preliminary Report on Patentability for International Application No. PCT/US2006/046108 (Oct. 2, 2008).
Notification of Transmittal of the International Search Report and the Written Opinion of the International Searching Authority, or the Declaration for International Application No. PCT/US2006/046108 (Sep. 9, 2008).
Interview Summary for U.S. Appl. No. 10/405,859 (Aug. 20, 2008).
Official Action for U.S. Appl. No. 11/706,837 (Jul. 29, 2008).
Communication of European publication number and information on the application of Article 67(3) EPC for Application No. 06844747.3 (Jul. 23, 2008).
Official Action for U.S. Appl. No. 10/405,859 (Mar. 17, 2008).
Restriction Requirement for U.S. Appl. No. 10/405,859 (Feb. 6, 2008).
"IP Multimedia Subsystem," printout from wikipedia.org, Wikimedia Foundation, Inc. (May 29, 2007).
Supplementary European Search Report for European application No. 04 756 094.1 (Mar. 29, 2007).
"HP OpenCall Home Subscriber Server Software—Data Sheet", 4AA0-3360ENW Rev. 2, Hewlett-Packard Development Company, L.P. (Jul. 2006).
Camarillo et al., "The Session Initiation Protocol (SIP) P-User-Database Private-Header (P-Header)," Network Working Group, RFC 4457, pp. 1-8 (Apr. 2006).
Liu et al., "Introduction to Diameter," IBM, pp. 1-12 (Jan. 24, 2006).
"Cisco IP Transfer Point as the Signaling Gateway for the Cisco BTS 10200 Softswitch," Cisco Systems, Inc., pp. 1-10 (Summer 2004).
"Cisco IP Transfer Point as the Signaling Gateway for the Cisco PGW 2200 Softswitch," Cisco Systems, Inc., pp. 1-11 (Summer 2004).
"Next-Generation Signaling Transports Cisco IP Transfer Point," Cisco Systems, Inc., pp. 1-27 (Summer 2004).
International Search Report in PCT Application No. 03/32626 (Mar. 5, 2004).
"A Study in Mobile Messageing: The Evolution of Messaging in Mobile Networks, and How to Efficiently and Effectively Manage the Growing Messaging Traffic," White Paper, Cisco Systems, Inc., pp. 1-6 (Spring 2004).
Walker, "The IP Revolution in Mobile Messaging," Packet, Cisco Systems Users Magazine, vol. 16, No. 1, pp. Cover; 73-74; and 89 (First Quarter 2004).
"Cisco ITP Multilayer Routing (MLR) SMS MO Routing Requirements," Cisco Systems, Inc., p. 1 (Copyright 2004).
"Cisco Signaling Gateway Manager Release 3.2 For Cisco IP Transfer Point," Cisco Systems, Inc., pp. 1-9 (Copyright 1992-2004).
"Solutions for Mobile Network Operators," Cisco Systems, Inc., pp. 1-8 (Copyright 1992-2004).
Moodie, "Agilent acceSS7: White Paper," Agilent Technologies, pp. 1-14 (Apr. 1, 2003).
"Cisco IP Transfer Point," Cisco Systems, Inc., pp. 1-10 (Copyright 1992-2003).
"Cisco IP Transfer Point Multilayer Short Message Service Routing Solution," Cisco Systems, Inc., pp. 1-6 (Copyright 1992-2003).
"Cisco ITP MAP Gateway for Public WLAN SlmAuthentication and Authorization," Cisco Systems, Inc., pp. 1-13 (Copyright 1992-2003).
Barry, "A Signal for Savings," Packet, Cisco Systems Users Magazine, vol. 14, No. 4, pp. Cover; 19-21; and 81 (Fourth Quarter 2002).
"Agilent Technologies and Cisco Systems SS7 Over IP White Paper," Cisco Systems, Inc. and Agilent and Technologies, pp. 1-6 (Copyright 2002—Printed in the UK Feb. 1, 2002).
"Cisco IP Transfer Point: MTP3 User Adaptation (M3UA) and SCCP User Adaptation (SUA) Signaling Gateway," Cisco Systems, Inc., pp. 1-14 (Copyright 2002).
"Cisco SS7 Port Adapter for the Cisco 7500 Versatile Interface Processor and 7200 VXR Routers Provide High-Density SS7 Agrregation," Cisco Systems, Inc., pp. 1-5 (Copyright 1992-2002).
"Next-Generation SS7 Networks with the Cisco IP Transfer Point," Cisco Systems, Inc., pp. 1-14 (Copyright 1992-2002).
The attached email dated Oct. 20, 2001 and PowerPoint presentation dated Oct. 24, 2001 disclose an MSISDN-based auto-provisioning solution proposed by a customer of the assignee of the presend application.
"Agilent acceSS7 Business intelligence," Agilent Technologies, pp. 1-6 (Copyright 2001—Printed in the UK Nov. 30, 2001).
"Cisco IP Transfer Point (ITP) Network Management Product Presentation," Cisco Systems, Inc., pp. 1-20 (Copyright 2001).
"Networkers," Cisco Systems, Inc., pp. 1-60 (Copyright 2001).
"Cisco SS7 Signaling Offload," Cisco Systems, Inc., pp. 1-33 (Copyright 1992-2001).
Rockhold, "Or," Wireless Review, p. 22, 23, 26, 28, 30, 32, (Aug. 15, 2000).
Bertrand, "Jambala Mobility Gateway-Convergence and Inter-System Roaming," Ericsson Review, p. 89-93 (1999).
"Topsail Beach—SS7 Over IP–" Cisco Systems, Inc., pp. 1-16 (Copyright 1999).
ETSI, "Digital Cellular Telecommunications Systems (Phase 2+); Support of Mobile Number Portability (MNP); Technical Realisation; Stage 2," Global System for Mobile Communications, p. 1-71, (1998).
Smith, "Number Portability Pileup," Telephony, p. 22, 24, 26 (Jan. 6, 1997).
Jain et al., "Phone Number Portability for PCS Systems with ATM Backbones Using Distributed Dynamic Hashing," IEEE, vol. 15 (No. 1), p. 96-105, (Jan. 1997).
Heinmiller, "Generic Requirements for SCP Application and GTT Function for Number Portability," Illinois Number Portability Workshop, p. 1-50, (Sep. 4, 1996).
International Telecommunication Union, "Series Q: Switching and Signalling: Specifications of Signalling Systems No. 7—Signalling Connection Control Part," p. 11-16, (Jul. 1996).
Rice, "SS7 Networks in a PCS World," Telephony, pp. 138, 140 142, 144, 146, (Jun. 24, 1996).
TEKELEC, "Eagle STP Planning Guide", Eagle Network Switching Division, (No. 3), p. i-vii, 1-64, A1-A2, B1-2, (May 1996).
Anonymous, "Generic Switching and Signaling Requirements for Number Portability," AT&T Network Systems, No. 1, p. 1-75, (Feb. 2, 1996).
ETSI, Digital Cellular Telecommunications System (Phase 2+); Mobile Application Part (MAP) Specification, Global System for Mobile Communications, pp. 112-114 (1996).
Jain, et al., "A Hashing Scheme for Phone Number Portability in PCS Systems with ATM Backbones," Bell Communications Research, p. 593-597, (1996).
Bishop, "Freeing the Network for Competition," Telecommunications, p. 75-80, (Apr. 1995).
Anonymous, "Zeichengabesysteme-Eine neue Generation für ISDN und intelligente Netze," Zeichengabesystem, Medien-Institut Bremen, p. iz-xi; 170-176, (Feb. 17, 1995).
Giordano et al., "PCS Number Portability," IEEE, p. 1146-1150, (Sep. 1994).
Bellcore, "Signaling Transfer Point (STP) Generic Requirements," Bell Communications Research, No. 1, p. ii-xxii, 4-84-J14, (Jun. 1994).
Telcordia Technologies, "CCS Network interface Specifications (CCSNIS) Supporting SCCP and TCAP," Bell Communications Research, p. ii-xii, 1-1-C-22, (Mar. 1994).
Buckles, "Very High Capacity Signaling Transfer Point for Intelligent Network Servcies," DSC Communications Corporation, p. 1308-1311, (1988).
"Diameter Overview," referenced from www.ulticom.com/html/products/signalware-diameter-reference-guide.asp (Publication date unknown).
"Chapter 1: Overview," SS7 Port Adapter Installation and Configuration, pp. 1-1-1-8 (Publication Date Unknown).
"Configuring ITP Basic Functionality," IP Transfer Point, Cisco IOS Release 12.2(4)MB12, pp. 31-50 (Publication Date Unknown).

(56) References Cited

OTHER PUBLICATIONS

"Configuring ITP Optional Features," IP Transfer Point, Cisco IOS Release 12.294)MB12, pp. 65-136 (Publication Date Unknown).

"Configuring M3UA and SUA SS7 Over IP Signaling Gateways," IP Transfer Point, Cisco IOS Release 12.2(4)MB13, pp. 51-66 (Publication Date Unknown).

"Configuring M3UA and SUA SS7 Over IP Signaling Gateways," IP Transfer Point, Cisco IOS Release 12.2(4)MB10, pp. 49-62 (Publication Date Unknown).

Notification of Transmittal of the International Search Report and the Written Opinion of the International Searching Authority, or the Declaration for International Application No. PCT/US2011/067130 (Jun. 7, 2012).

Commonly-assigned, co-pending U.S. Appl. No. 13/336,132 for "Methods, Systems, and Computer Readable Media for Modifying a Diameter Signaling Message Directed to a Charging Function Node," (Unpublished, filed Dec. 23, 2011).

Commonly-assigned, co-pending International Application No. PCT/US11/67130 for "Methods, Systems, and Computer Readable Media for Modifying a Diameter Signaling Message Directed to a Charging Function Node," (Unpublished, filed Dec. 23, 2011).

U.S. Appl. No. 61/576,213 for "LTE HSS with HLR Proxy Mode for Mobility" (Unpublished, filed Dec. 15, 2011).

Korhonen et al., "Clarifications on the Routing of Diameter Requests Based on the Username and the Realm," RFC 5729, pp. 1-12 (Dec. 2009).

Korhonen et al., "Diameter User-Name and Realm Based Request Routing Clarifications," draft-ietf-dime-nai-routing-04.txt, pp. 1-13 (Oct. 6, 2009).

"3rd Generation Partnership Project; Technical Specifications Group Service and System Aspects; Telecommunication management; Charging management; Diameter charging applications (Release 7)," 3GPP TS 32.299, V7.7.0, pp. 1-120 (Sep. 2007).

Non-Final Office Action for U.S. Appl. No. 12/732,178 (Nov. 6, 2012).

Final Office Action for U.S. Appl. No. 12/732,178 (Jun. 17, 2013).

Notice of Allowance and Fee(s) Due for U.S. Appl. No. 13/336,132 (May 20, 2013).

First Examination Report for Indian Application No. 3231/CHENP/2008 (Jan. 2, 2013).

Non-Final Office Action for U.S. Appl. No. 13/336,132 (Dec. 18, 2012).

Commonly-assigned, co-pending U.S. Appl. No. 13/714,360 for "Methods, Systems, and Computer Readable Media for Seamless Roaming Between Diameter and Non-Diameter Networks," (Unpublished, filed Dec. 13, 2012).

U.S. Appl. No. 61/291,961 for "A GTP Relay for Direct Internet Access from the Roaming Mobile Network and Other Services," (Unpublished, filed Jan. 4, 2010).

Calhoun et al., "Diameter Base Protcol," Network Working Group, RFC 3588 (Sep. 2003).

Communication of European publication No. and information on the application of Article 67(3) EPC for European Application No. 11852129.3 (Oct. 2, 2013).

Second Examination Report for Indian Application No. 3231/CHENP/2008 (Aug. 6, 2013).

Applicant-Initiated Interview Summary for U.S. Appl. No. 12/732,178 (Sep. 26, 2013).

Notice of Allowance and Fee(s) Due for U.S. Appl. No. 13/336,132 (Sep. 23, 2013).

* cited by examiner

SYSTEMS, METHODS, AND COMPUTER READABLE MEDIA FOR USING A SIGNALING MESSAGE ROUTING NODE TO PROVIDE BACKUP SUBSCRIBER INFORMATION MANAGEMENT SERVICE

PRIORITY CLAIM

This application claims the benefit of U.S. Provisional Patent Application Ser. No. 61/308,280, filed Feb. 25, 2010; the disclosure of which is incorporated herein by reference in its entirety.

TECHNICAL FIELD

The subject matter described herein relates to methods and systems for increasing a network's reliability and robustness. More particularly, the subject matter described herein relates to systems, methods, and computer readable media for using a signaling message routing node to provide backup subscriber information management service.

BACKGROUND

In conventional telecommunications networks that support mobile subscribers, one or more network entities maintain what is referred to as subscriber information, which may include the identity of the subscriber, the services that are available to the subscriber, and the current location of the mobile subscriber. In conventional telecommunications networks, certain network entities are responsible for maintaining subscriber information and for making that information available when needed. For example, global system for mobile communications (GSM) networks include a home location register, or HLR, which maintains information about subscribers to a mobile network. In Internet protocol media subsystems (IMS) networks, some of the same or similar functions are performed by a home subscriber server, or HSS. For simplicity, a network entity responsible for maintaining subscriber information is hereinafter generically referred to an HLR/HSS.

Access to subscriber information is vital to the operation of a mobile telecommunications network. Other network elements, such as mobile switching centers (MSCs) and call session control functions (CSCFs) communicate mobile subscriber status information to the HLR/HSS nodes using various signaling protocols, including GSM/IS-41 mobile application part (MAP), Diameter, and others. Example subscriber information management messages include MAP and Diameter UpdateLocation messages, Diameter user data request (UDR) messages, Diameter profile update, Diameter location information request (LIR) messages, Diameter server assignment request (SAR) messages, and MAP signal routing information (SRI) messages. These messages carry, among other things, information that identifies the current serving MSC or CSCF. The HLR/HSS is also configured to provide mobile subscriber information to a requesting MSC or CSCF.

There are disadvantages associated with conventional telecommunications networks that support mobile subscribers. In conventional networks, mobile subscribers are assigned or homed to a single subscriber information management node, such as an HLR or HSS. If the HLR/HSS nodes in a mobile communications network become unreachable, isolated, or otherwise unavailable, major service disruptions are possible and likely. What is needed, therefore, is a system and method for minimizing the negative impact of loss of access to subscriber information management information, such as may occur as a result of HLR/HSS network element isolation events in a mobile telecommunications network.

One conventional approach to overcome the disadvantages stated above has been to create an entity, called a gateway location register, or GLR, that copies mobility management messages, caches all of the information contained within the mobility management messages, and responds on behalf of the HLR/HSS when possible, in order to reduce the workload on the HLR/HSS. This conventional approach suffers the disadvantage that the GLR always responds on behalf of the HLR/HSS, even if the HLR/HSS is operational. What is needed is a system or method which provides backup service, responding only when the HLR/HSS is not operational.

Another conventional approach to overcome the disadvantages stated above has been to distribute the function of an HLR/HSS across a bank of nodes, where each individual HLR/HSS services a particular subset of subscribers, and to place a distribution function between the bank of nodes, where the each subscriber is routed to that subscriber's HLR/HSS. This conventional approach suffers the disadvantage that failure of a particular HLR/HSS causes a loss of service to whichever subscribers had been assigned to that HLR/HSS. Rather than protect against loss of service, this approach limits loss of service to a subset of subscribers rather than having all subscribers lose service. However, if the distribution function fails, all subscribers lose service anyway. What is needed is a system or method which can supplement this conventional approach by providing backup service for both any individual HLR/HSS that may fail, and also provide backup service in case the distribution function fails as well.

Another conventional approach to overcome the disadvantages stated above involves load sharing across multiple HLR/HSS nodes, where messages are distributed across the nodes to reduce the load on any individual node. This conventional approach suffers the disadvantage that each node must contain a full copy of the subscriber information database. This gives rise to overhead required to keep all databases in synchronization with each other. This approach suffers the additional disadvantage that a corrupted entry in one node's database is quickly replicated across all nodes' databases, rendering them all susceptible to the same kind of database corruption. What is needed is a system or method which stores information independently from the HLR/HSS nodes and is thus isolated from corruption of any one of the HLR/HSS nodes.

Accordingly, in light of these disadvantages, there exists a need for systems, methods, and computer readable media for using a signaling message routing node to provide backup subscriber information management service.

SUMMARY

Methods, systems, and computer readable media for using a signaling message routing node to provide a backup subscriber information management service are disclosed. According to one method, a signaling message routing node obtains information associated with a subscriber. The signaling message routing node receives a first subscriber information management message including a message destination and being associated with the subscriber. The signaling message routing node determines whether the message destination is operable to process the first subscriber information management message. In response to determining that the message destination node is operable to process the first subscriber information management message, the signaling message routing node routes the first subscriber information message to the message destination. In response to determining that the message destination is not operable to process the first subscriber information management message, the signaling message routing node responds to the first subscriber information management message on behalf of the message.

The subject matter described herein for using a signaling message routing node to provide backup subscriber information management service and may be implemented in software in combination with hardware and/or firmware. For example, the subject matter described herein can be implemented in software executed by a processor. As such, the terms "function" or "module" as used herein refer to software in combination with hardware and/or firmware for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media are provided for using a signaling message routing node to provide backup subscriber information management service. In one embodiment, a signaling message routing node is configured to provide home location register/home subscriber server backup. In this embodiment, if the HLR/HSS element in a mobile communications network becomes unreachable, unavailable, or isolated, queries that would normally be routed to and received by the HLR/HSS are redirected by the router to a subscriber information management module. The subscriber information management module receives, processes, and responds to the HLR/HSS query on behalf of the intended HLR/HSS element. The signaling message routing node may also be configured to provide an auto-provisioned subscriber location cache. Reference will now be made in detail to exemplary embodiments of the present invention, examples of which are illustrated in the accompanying drawings. Wherever possible, the same reference numbers will be used throughout the drawings to refer to the same or like parts.

Figure 1:
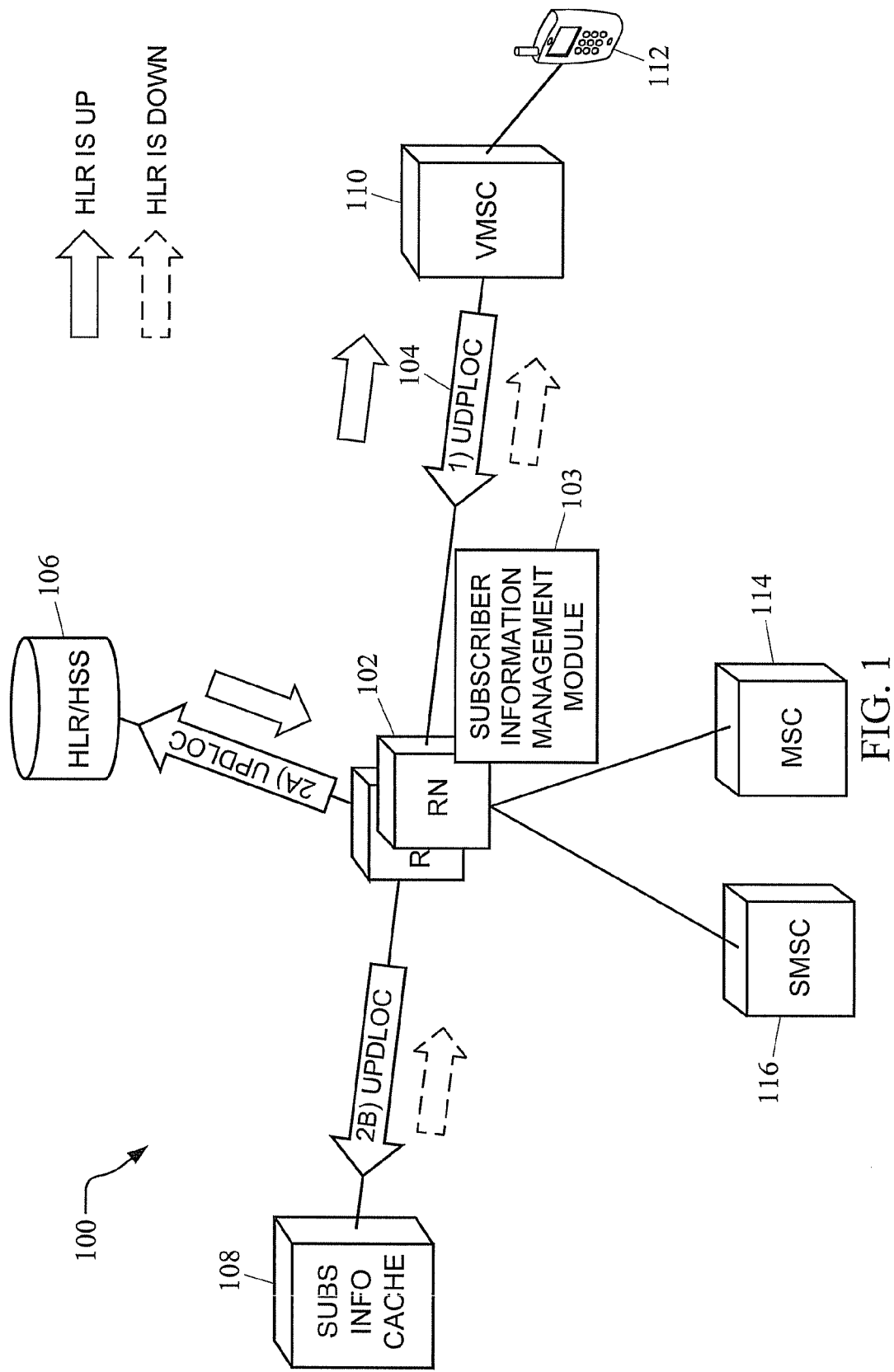
FIG. 1 is a block diagram illustrating a system for using a signaling message routing node to provide backup subscriber information management service according to an embodiment of the subject matter described herein.

FIG. 1 is a block diagram illustrating a system for using a signaling message routing node to provide backup subscriber information management service according to an embodiment of the subject matter described herein. In the embodiment illustrated in FIG. 1, a signaling message routing node is used to provide home location register/home subscriber server backup. System 100 includes a signaling message routing node 102 including a subscriber information management module 103. As will be set forth in detail below, subscriber information management module 103 may obtain information associated with a subscriber through interception of subscriber information management messages and caching of subscriber information from those messages at a subscriber information cache 108, which may be integrated with or separate from signaling message routing node 102. In the illustrated example, subscriber information management module 103 may receive a subscriber information management message 104 having a message destination and being associated with a subscriber. The message destination may be HLR/HSS 106 or other node that stores subscriber information. Signaling message routing node 102 determines whether HLR/HSS 106 is operable to process subscriber information management message 104. If HLR/HSS 106 is operable to process subscriber information management message 104, signaling message routing node 102 routes subscriber information management message 104 to HLR/HSS 106. If HLR/HSS 106 is not operable to process subscriber information management message 104, signaling message routing node 102 responds to subscriber information management message 104 on behalf of HLR/HSS 106. The dashed arrows in FIG. 1 represent the message path when HLR/HSS 106 is not operable to process subscriber information management message 104, and the solid arrows represent the case where message destination 106 is operable to process subscriber information management message 104.

In the embodiment illustrated in FIG. 1, signaling message routing node 102 is a signal transfer point (STP), but in alternative embodiments, signaling message routing node 102 may be a signaling gateway (SG), an edge router, a session initiation protocol (SIP) signaling router (SSR), a Diameter signaling router (DSR), an Internet protocol (IP) router, an IP multimedia subsystem (IMS) router, or other entity for routing signaling messages.

Similarly, subscriber information cache 108 can be any suitable node for storing subscriber information. As set forth above, subscriber information cache 108 can be an internal database to signaling message routing node 102. Alternatively, subscriber information cache 108 can be an STP, a signaling gateway, a signaling router, a DSR, an IP router, an IMS router, a server, a service control point, or other suitable node separate from with storage capacity.

Subscriber information management message 104 may be mobile application part (MAP) protocol message, a Diameter protocol message, or other type of subscriber information management message. For example, subscriber information management message 104 may be a request to update a subscriber's location information, such as an UpdateLoc message, a request for location information, such as LOC_REQ, a request for routing information for a particular subscriber, such as SRI and SRI_SM, or a registration message. Subscriber information management message 104 may alternatively be a Diameter server assignment request (SAR) message, a Diameter location information request (LIR) message, a Diameter profile update request (PUR) message, a Diameter update location request (ULR), a Diameter user data request (UDR) message, or any other Diameter message received on the Cx, Sh, S6a, S6b, or Sp interface.

The information associated with a subscriber that is obtained by signaling message routing node 102 may be information identifying the subscriber or identifying a network node that is currently serving the subscriber. Information identifying the subscriber may include an international mobile subscriber identity (IMSI) of the subscriber, a mobile station integrated services digital network (MSISDN) number of the subscriber, or other information identifying the subscriber. Information identifying a network node that is currently serving the subscriber may include the address of the node, such as a point code of the node, an IP address of the node, a name, a uniform resource identifier (URI), a uniform resource locator (URL), a Diameter node identifier, or other information identifying the node. Examples of nodes that serve subscribers include mobile switching centers (MSCs), such as visiting MSC (VMSC) 110, which, in the embodiment illustrated in FIG. 1 is serving mobile subscriber 112, and MSC 114. Other nodes may include mobile switching center servers (MSCSs), short message service centers (SM-SCs), such as SMSC 116, call session control functions (CSCFs), etc.

The information obtained by routing node 102 and stored in subscriber information cache 108 may be all or a subset of the information normally stored in HLR/HSS 106. For example, basic HLR/HSS functionality may be approximated by storing only the subscriber identity and the identity of the node currently serving that subscriber. Additional information may be stored as well, such as the subscriber's profile, which may indicate the type of subscriber (subscription or pre-paid, local/national/international calling plan, etc.) as well as services that the subscriber has access to (calls, text messages, media streaming, Internet access, etc.) To save space, however, subscriber information cache 108 may store one or only a few basic service profiles that would take effect in the event that HLR/HSS 106 becomes inoperable. In this manner, network subscribers and their visitors would be allowed basic access, such as incoming and outgoing calls, limited text messaging, etc., even in an emergency situation. Alternatively, subscriber information cache 108 may provide only one profile for all subscribers in the event of failure of the HLR/HSS 106. Although not described explicitly with respect to FIG. 1, other functions typically performed by HLR/HSS nodes may also be provided by subscriber information cache 108 and/or routing node 102.

Providing backup subscriber information management service may include providing backup presence service, status updates, registration, and prepaid service. In alternative embodiments, telecommunications system 100 may include or consist of any wireless protocol, including WiMax and WiFi. In alternative embodiments, system 100 could provide backup service for other nodes or other subscriber information management nodes—not just for HLR/HSS nodes. In alternative embodiments, system 100 may include or consist of other network types, such as IMS, or other packet networks, wireline networks, etc.

Figure 2:
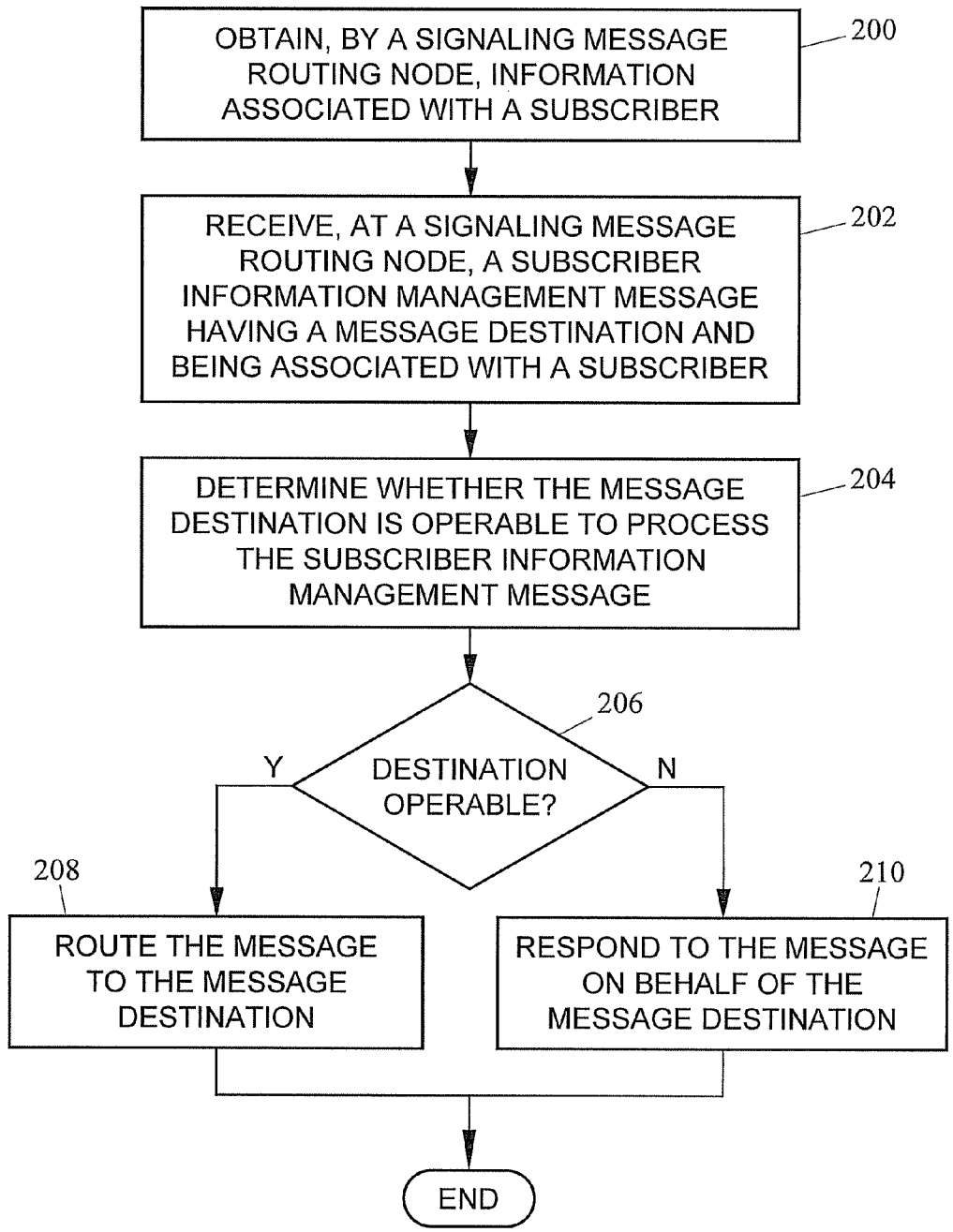
FIG. 2 is a flow chart illustrating an exemplary process for using a signaling message routing node to provide backup subscriber information management service according to an embodiment of the subject matter described herein.

FIG. 2 is a flow chart illustrating an exemplary process for using a signaling message routing node to provide backup subscriber information management service. This process is described with reference to FIGS. 1 and 2.

In step 200, information associated with a subscriber is obtained by a signaling message routing node. For example, signaling message routing node 102 may obtain information associated with a subscriber by intercepting subscriber information management messages and caching subscriber information from those messages in subscriber information cache 108. An exemplary process for obtaining subscriber information will be described in detail with respect to FIG. 3.

In step 202, a subscriber information management message having a message destination and being associated with a subscriber is received at the signaling message routing node. In the example illustrated in FIG. 1, routing node 102 receives an UpdateLocation message 104, which is being sent from visited MSC (VMSC) 110 to HLR/HSS 106, to inform HLR/HSS 106 of the location of mobile subscriber 112. UpdateLocation message 104 includes the identity of mobile subscriber 112.

In step 204, it is determined whether the message destination is operable to process the subscriber information management message. In one embodiment, either routing node 102 or subscriber information cache 108 may use a physical level protocol, a link level protocol, a network level protocol, an application level protocol, a high-availability protocol, or other suitable protocol to determine whether HLR/HSS 106 is operable to process UpdateLocation message 104. For example, network management messages such as subsystem status test (SST), subsystem prohibited (SSP), and subsystem restricted (SSR) may be used. Other mechanisms for determining the health of message destination 106 include link and linkset monitoring, ping, ICMP, and high availability (HA) protocols. For LTE, the SCTP level handshake can detect failure of the host node and/or failure of an application on the host node. A routing node may detect the failure of HLR/HSS 106 via SS7, SCTP, Diameter, and SIGTRAN protocol handshakes. Alternatively, either routing node 102 or subscriber information management cache 108 may receive notification from an entity other than HLR/HSS 106 that HLR/HSS 106 is not operational to process subscriber information management message 104. For example, this notification may be issued from a network operator or network controller, such as when the network operator detects that HLR/HSS 106 is down or disables HLR/HSS 106 for maintenance, etc.

In step 206, if the message destination is operable to process the subscriber information management message, the process moves to step 208, in which the subscriber information management message is routed to the message destination. In the embodiment illustrated in FIG. 1, routing node 102 may forward subscriber information management message 104 to HLR/HSS 106. However, if the message destination is not operable to process the subscriber information management message, the process moves to step 210, in which an entity that is different from the message destination node responds to the subscriber information management message on behalf of the message destination node. In the embodiment illustrated in FIG. 1, either cache 108 or routing node 102 may respond to subscriber information management message 104 responding to the message originator with an answer to subscriber information management message that would be expected from HLR/HSS 106. For example, if the message is a Diameter update location request message, the response may be an update location answer message indicating that the update location transaction is allowed. Routing node 102 may also update the information stored within cache 108 to accord to the contents of subscriber information management message 104. For example, if the subscriber information management message contains new location or status information concerning the subscriber, this information may be stored in cache 108.

In the case where subscriber information management message 104 is a request for location information, responding on behalf of HLR/HSS 106 may include providing the requested subscriber information to the message originator. For example, subscriber information management message 104 may be a request for subscriber location information, such as a send routing information (SRI) message, a send routing information for short messages (SRI_SM) message, a location request (LOC_REQ) message, etc. This type of message is hereinafter referred to generically as a subscriber information request. In this scenario, if HLR/HSS 106 is operable, message 104 is forwarded to HLR/HSS 106. If HLR/HSS 106 is not operable, cache 108 or routing node 102 may respond to message 104 with the latest location information for the subscriber that was stored within cache 108. If subscriber information management message 104 is a registration request, routing node 102 or cache 108 may respond with a registration response containing updated subscriber registration information.

Thus, responding to subscriber information management message 104 may include responding to a request for location update with an answer message indicating that the location update is allowed or responding to a request for profile information by providing user profile information to the requesting entity. In the latter example, profile information may include information about what services a subscriber does and does not have access to, the type of subscriber, etc.

Figure 3:
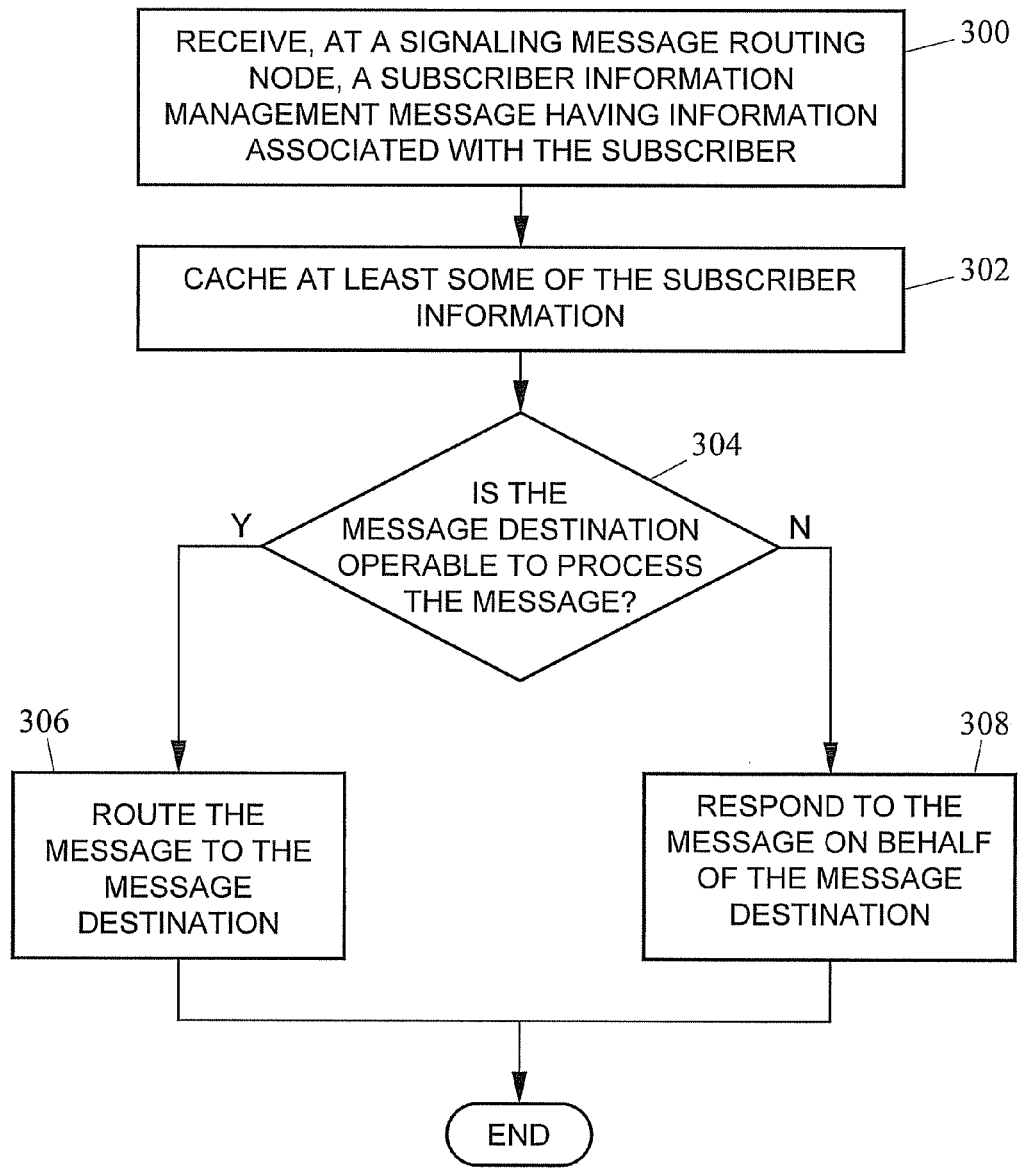
FIG. 3 is a flow chart illustrating an exemplary process for obtaining subscriber information by a signaling message routing node according to an embodiment of the subject matter described herein.

FIG. 3 is a flow chart illustrating an exemplary process for obtaining subscriber information at a routing node, providing further detail for step 200 in FIG. 2. In FIG. 2, it is assumed that routing node has received the message and identified the message as being of the type that carries subscriber information. For example, signaling message routing node 102 may determine whether a received message is a MAP or Diameter message that is of a type that includes subscriber information. Exemplary MAP messages that include subscriber information include location update and registration notification messages. Exemplary Diameter messages that include subscriber information include server assignment request (SAR) messages, profile update request (PUR) messages, and update location request (ULR) messages. Such a determination may be performed by routing node 102 decoding the message to determine the message type and determining whether the message type is one of the aforementioned message types that contain subscriber information.

Referring to FIG. 3, in step 300, a subscriber information management message information associated with a subscriber is received at a signaling message routing node. For example, message 104 may be received by routing node 102. Message 104 may be addressed to HLR/HSS 106. In step 302, at least some of the subscriber information is stored in a subscriber information cache. For example, routing node 102 may cache the subscriber information in subscriber information cache 108.

In step 304, it is determined whether the message destination is operable to process the subscriber information management message. If so, the process moves to step 306, in which the subscriber information management message is routed to the message destination, and the process ends. If, in step 304, it is determined that the message destination node is not operable to process the subscriber information management message, the process moves to step 308, where the subscriber information management message is responded to on behalf of the message destination node. For example, routing node 102 may respond on behalf of HLR/HSS 106 in response to receiving a subscriber information management message that contains subscriber information by sending the corresponding answer or acknowledge message to the message originator.

Figure 4:
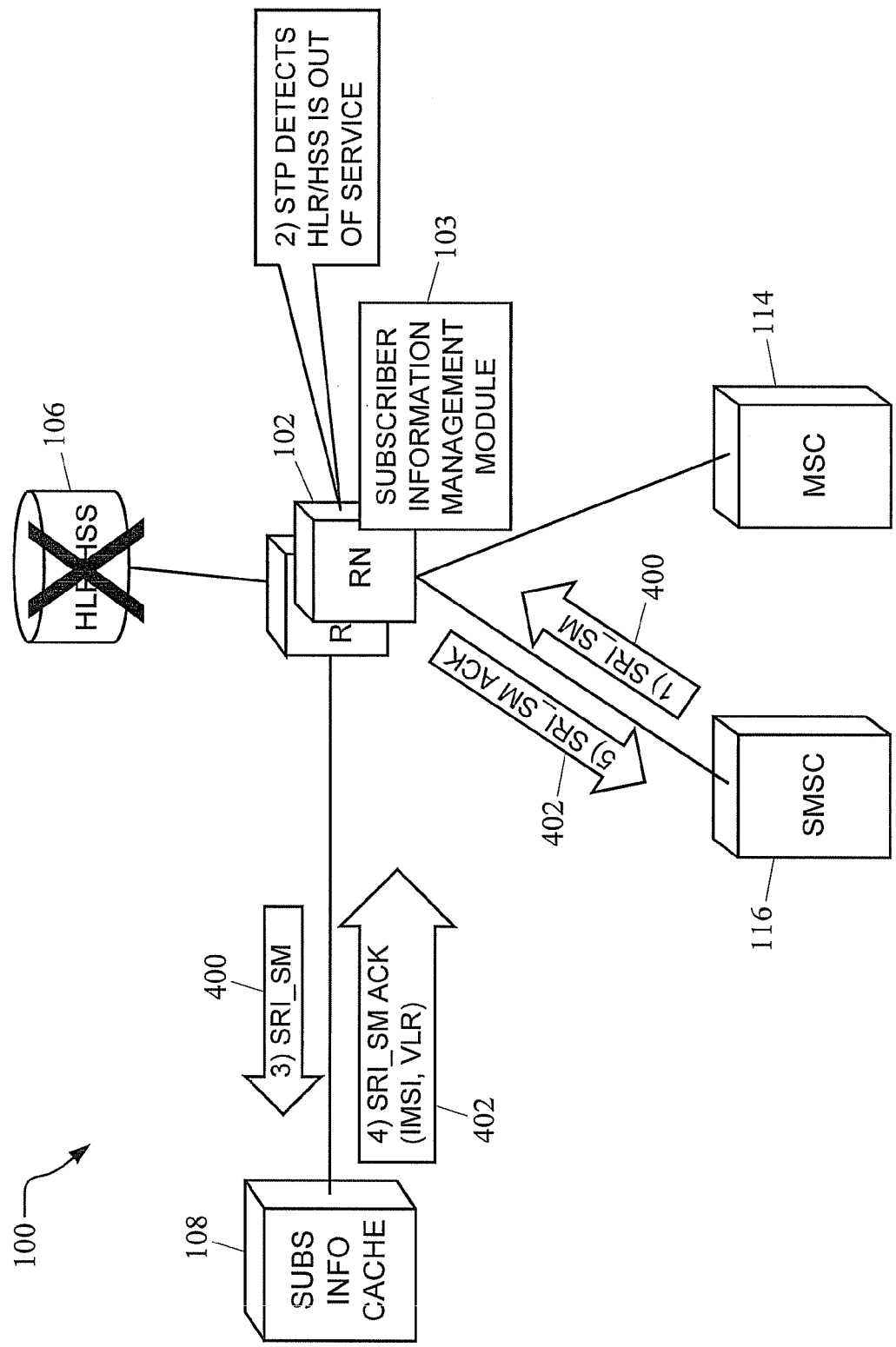
FIG. 4 is a block diagram illustrating a system for using a signaling message routing node to provide backup subscriber information management service including routing of short message service (SMS) messages according to another embodiment described herein.

FIG. 4 is a block diagram illustrating a system for using a signaling message routing node to provide backup subscriber information management service including routing of short message service (SMS) messages according to another embodiment described herein. In the embodiment illustrated in FIG. 4, SMSC 116 sends a send routing information for short messages (SRI_SM) message 400 to HLR/HSS 106. Routing node 102 intercepts SRI_SM message 400 and detects that HLR/HSS 106 is out of service. In response to detecting that HLR/HSS 106 is out of service, Routing node 102 forwards SRI_SM message 400 to cache node 108, which responds to SRI_SM message 400 with a send routing information for short messages acknowledgment (SRI_SM Ack) message 402. Routing node 102 receives SRI_SM Ack message 402 and forwards it to the requesting entity, SMSC 116.

Figure 5:
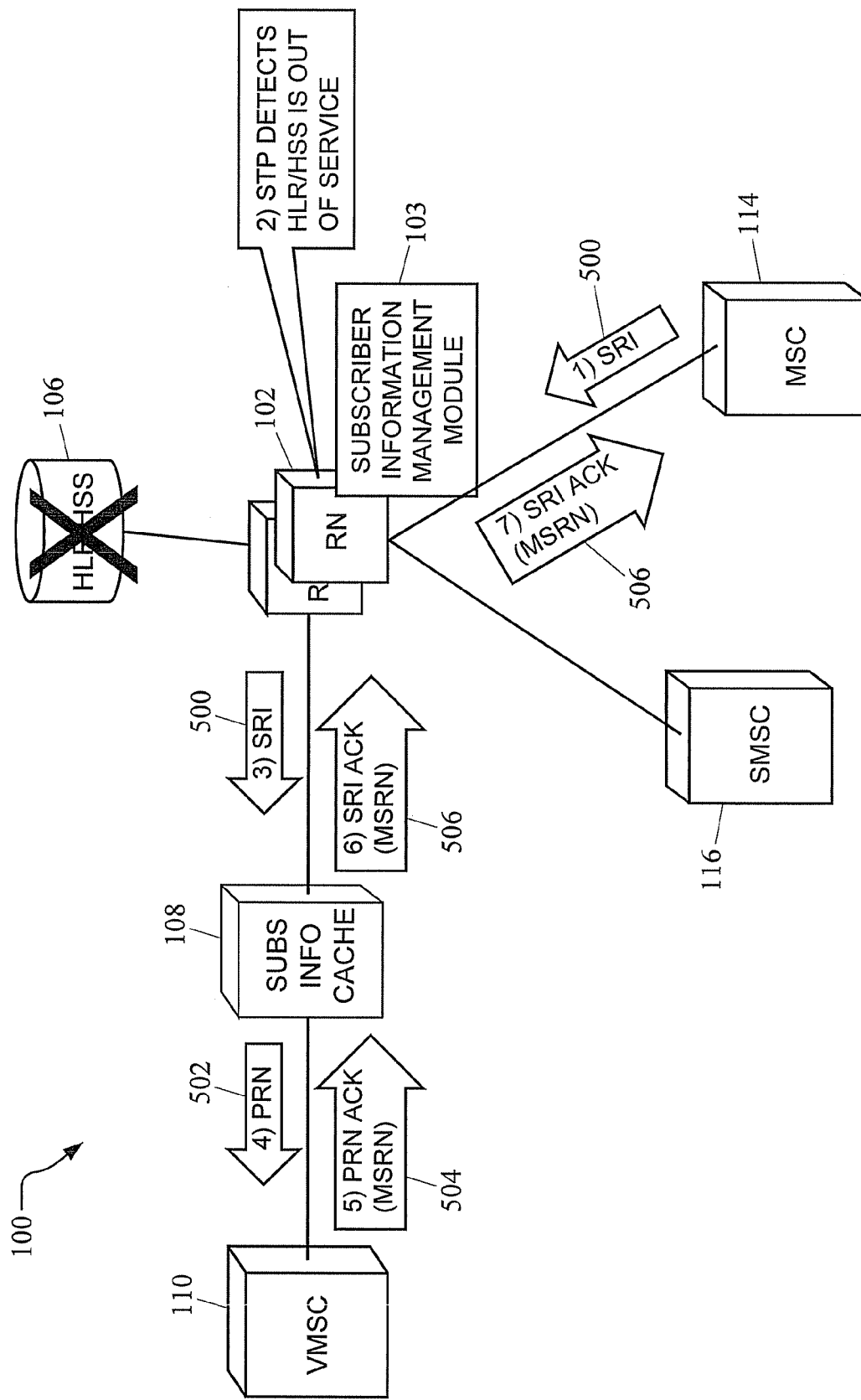
FIG. 5 is a block diagram illustrating a system for using a signaling message routing node to provide backup subscriber information management service including routing of voice calls according to yet another embodiment described herein.

FIG. 5 is a block diagram illustrating a system for using a signaling message routing node to provide backup subscriber information management service including routing of voice calls according to yet another embodiment described herein. In the embodiment illustrated in FIG. 5, MSC 114 sends a send routing information (SRI) message 500 to HLR/HSS 106. Routing node 102 intercepts SRI message 500 and detects that HLR/HSS 106 is out of service. In response to detecting that HLR/HSS 106 is out of service, routing node 102 forwards SRI message 500 to subscriber information cache 108. Subscriber information cache 108 issues a provide roaming number (PRN) message 502 to VMSC 110. VMSC 110 responds by sending to subscriber information cache 108 a PRN acknowledge (PRN Ack) message 504 that contains the mobile station routing number (MSRN) for the subscriber. Subscriber information cache 108 retrieves the MSRN information from PRN Ack message 504 and sends that information in an SRI acknowledge (SRI Ack) message 506 to routing node 102. Routing node 102 forwards SRI Ack message 506 to MSC 114. Thus, in FIG. 5, subscriber information cache 108, in addition to caching subscriber location information and responding on behalf of HLR/HSS 106, performs the provide roaming number function of HLR/HSS 106.

Figure 6:
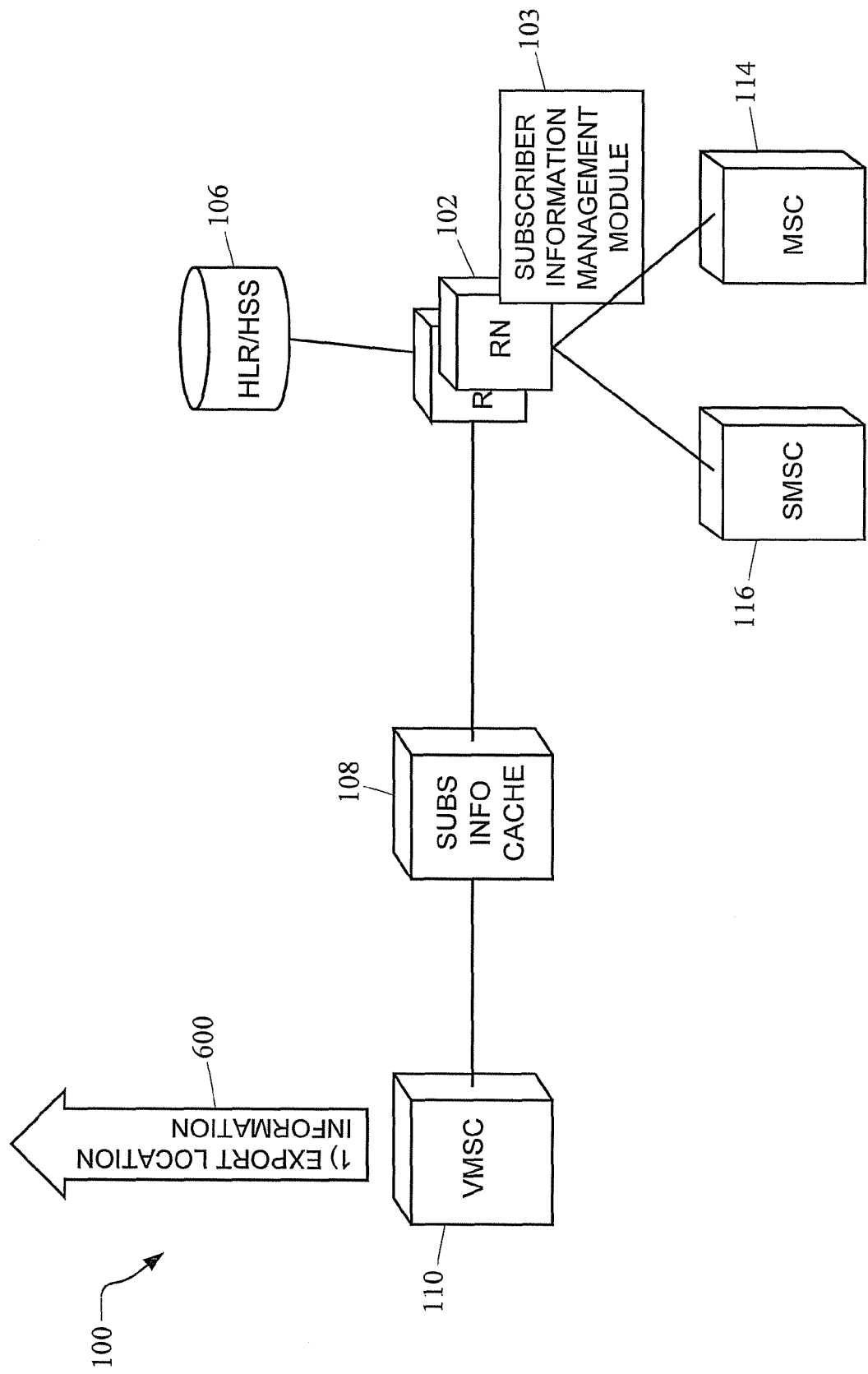
FIG. 6 is a block diagram illustrating a system for using a signaling message routing node to provide backup subscriber information management service according to yet another embodiment described herein.

FIG. 6 is a block diagram illustrating the system of FIG. 5 where VMSC 110 exports location information (or other subscriber information) 600, for the purpose of offload or backup. The location information or other subscriber information may be that obtained from routing node 102 and/or cache 108. Thus, routing node 102 and/or cache 108 facilitate the distribution of subscriber information among network nodes, even when the HLR/HSS is down.

Figure 7:
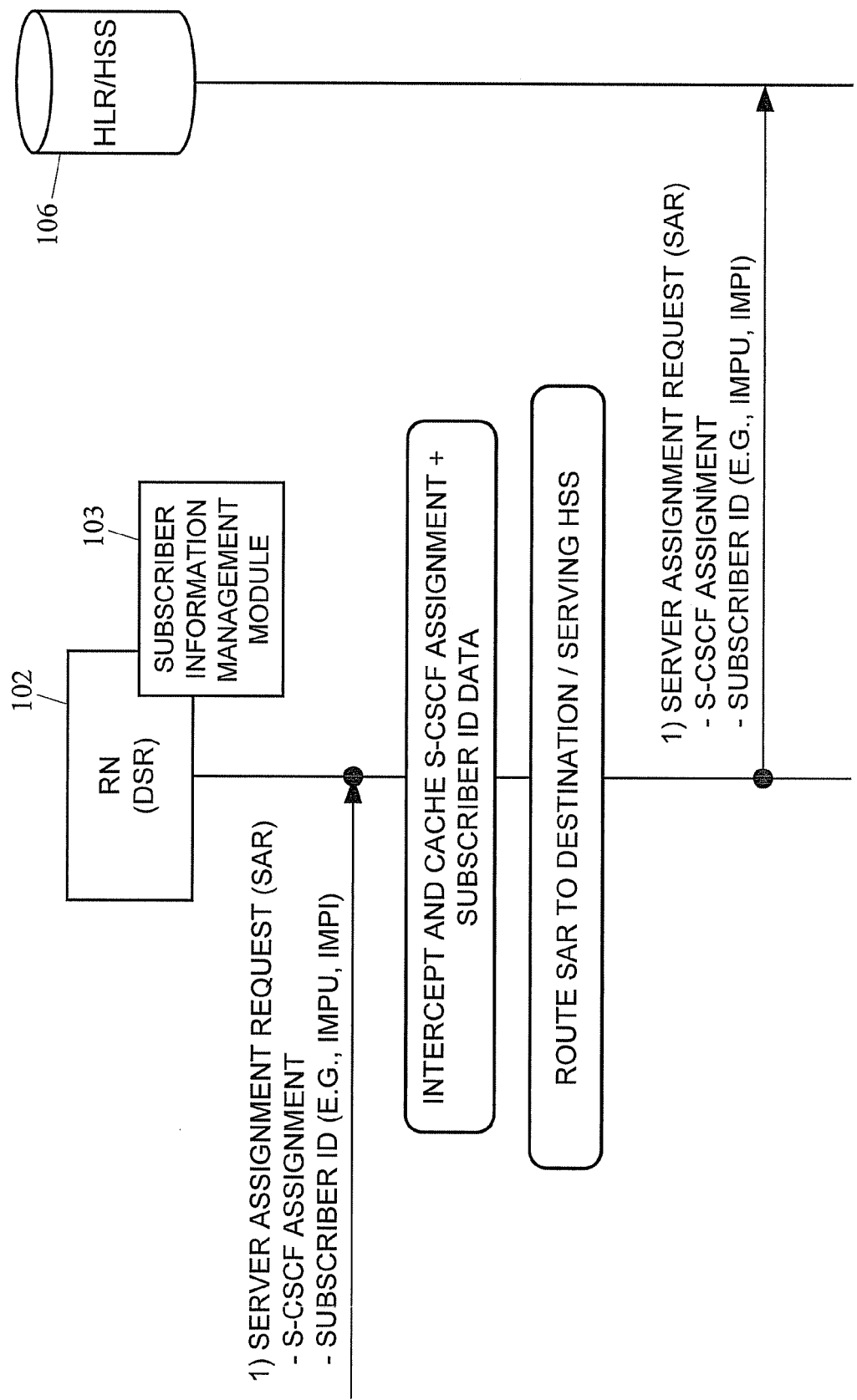
FIGS. 7 and 8 are message flow diagrams illustrating providing backup subscriber information management service for a first set of Diameter transactions according to an embodiment of the subject matter described herein.
Figure 8:
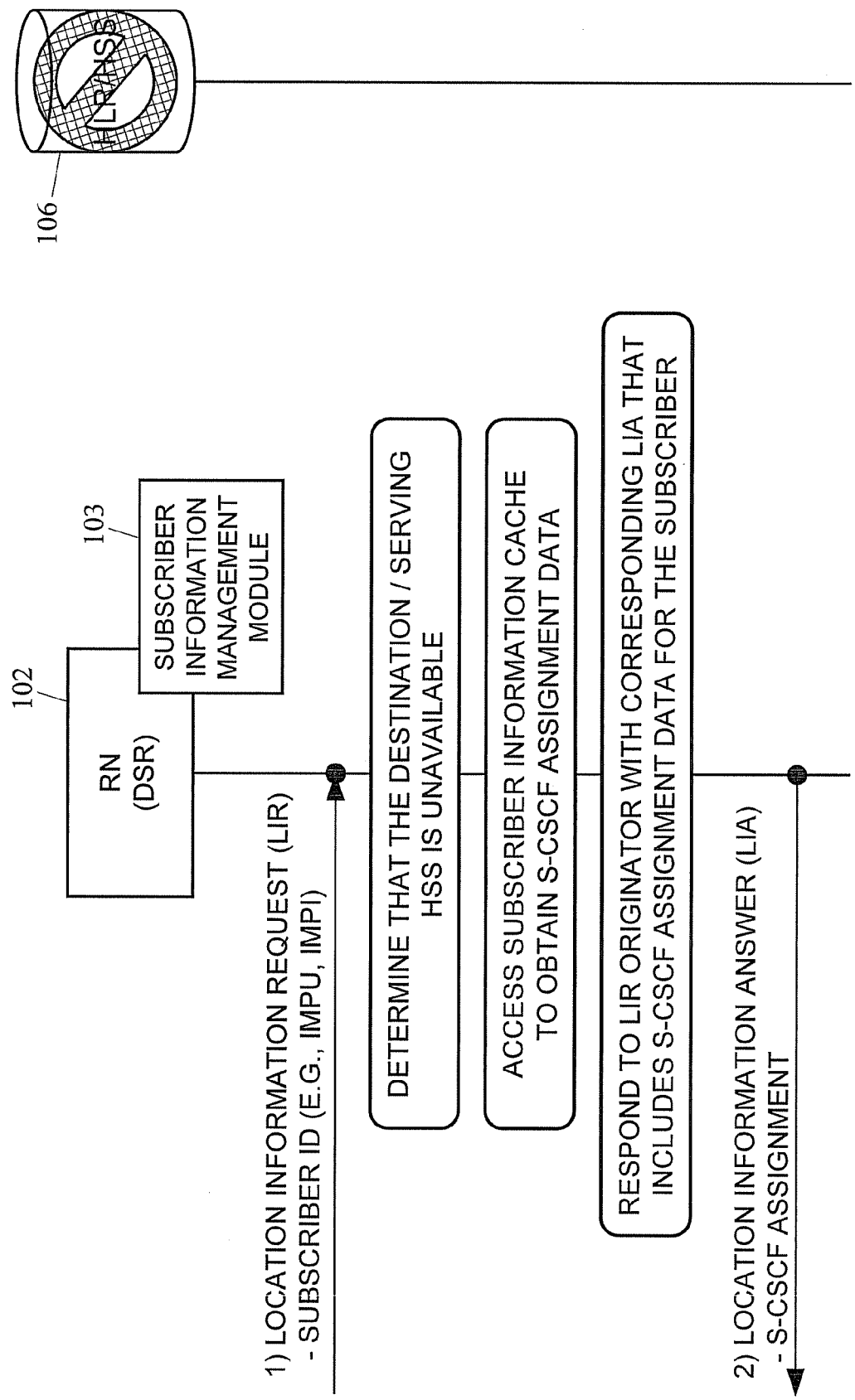

In the examples above, backup subscriber information management service is provided for various types of mobile application part (MAP) messages. In addition, the subject matter described herein may be used to provide backup subscriber information management service for various types of Diameter transactions. FIGS. 7 and 8 are message flow diagrams illustrating providing subscriber information backup service for Diameter messages exchanged over a Cx interface according to an embodiment of the subject matter described herein. Referring to FIG. 7, signaling message routing node 102 comprises a Diameter signaling router with subscriber information management module 103. Routing node 102 may communicate with home subscriber server 700 via a Cx interface. In the illustrated example, routing node 102 receives a Diameter server assignment request (SAR) message from another node, such as a serving call session control function (S-CSCF). In IMS networks, all calls to a mobile subscriber are directed through S-CSCF assigned to the subscriber. The S-CSCF assigned to the subscriber stores the binding between the subscriber IMS public identifier (IMPU), IMS private identifier (IMPI), and the S-CSCF identifier. The SAR message may contain this binding, and is sent to the HSS where the binding may be stored. In the illustrated example, the SAR message is intercepted by routing node 102. Subscriber information management module 103 caches the binding between the subscriber identifiers and the S-CSCF. Routing node 102 then routes the SAR message to HLR/HSS 106.

In FIG. 8, HLR/HSS 106 is assumed to be down. Accordingly, when routing node 102 receives a Diameter location information request (LIR) message specifying the same subscriber identifier cached in the signaling message flow in FIG. 8, routing node 102 identifies HLR/HSS 106 as the serving HLR/HSS, and determines whether HLR/HSS 106 is available. In this example, because HSS 106 is not available, routing node 102 accesses the subscriber information cache to obtain the S-CSCF assignment data. Routing node 102 then responds on behalf of HLR/HSS 106 to the originator of the LIR message with a corresponding LIA message that includes the S-CSCF assignment data for the subscriber.

Figure 9:
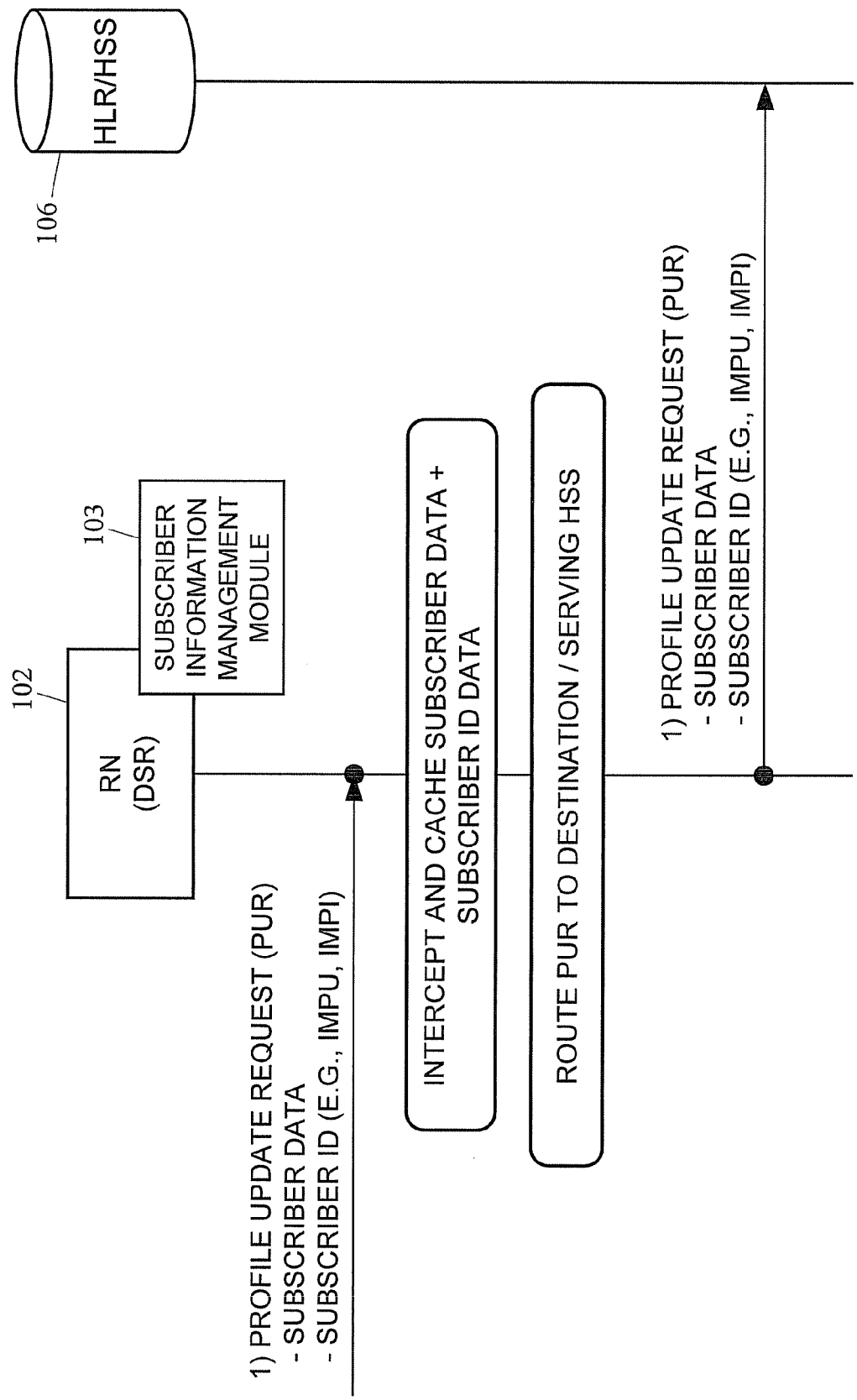
FIGS. 9 and 10 are message flow diagrams illustrating the providing of backup subscriber information management service for a second set of Diameter transactions according to an embodiment of the subject matter described herein.
Figure 10:
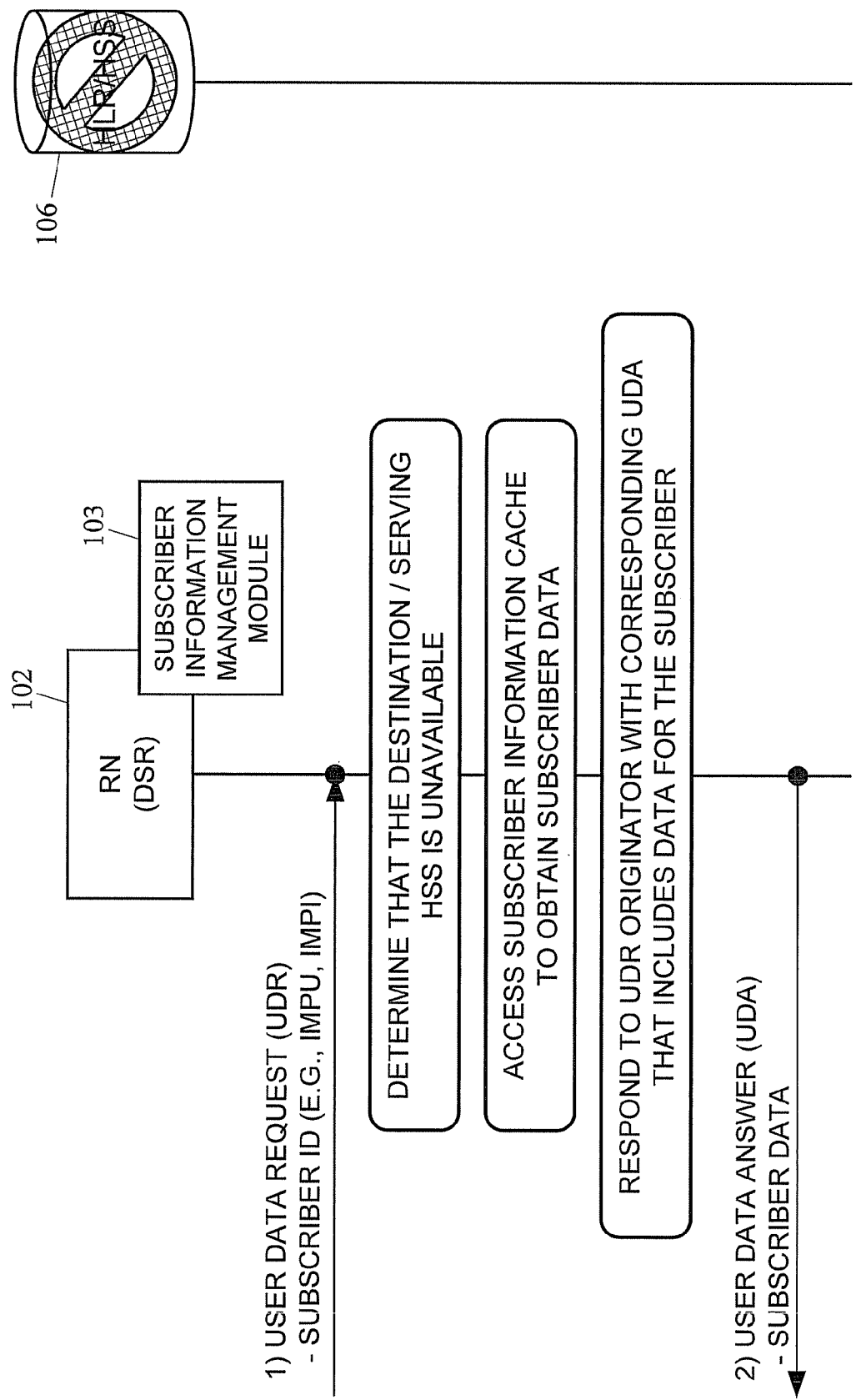

FIGS. 9 and 10 illustrating the providing of backup subscriber information management service for Diameter transactions that occur on the IMS Sh interface according to an embodiment of the subject matter described herein. Referring to FIG. 9, routing node 102 receives a Diameter profile update request (PUR) message containing subscriber data and the IMS public and private identifiers for the subscriber. Routing node 102 intercepts the PUR message, caches the subscriber data in the corresponding subscriber identifier, and routes the PUR message to serving HLR/HSS 106.

Referring to FIG. 10, in line 1, DSR receives a user data request specifying the same subscriber identifiers for PUR message illustrated in FIG. 9. Accordingly, routing node 102 identifies HLR/HSS 106 as a serving HSS and determines that serving HLR/HSS 106 is not available. Routing node 102 accesses the subscriber information cached to obtain the subscriber data and responds to the UDR originator with a corresponding UDA message that includes the data for the subscriber.

Figure 11:
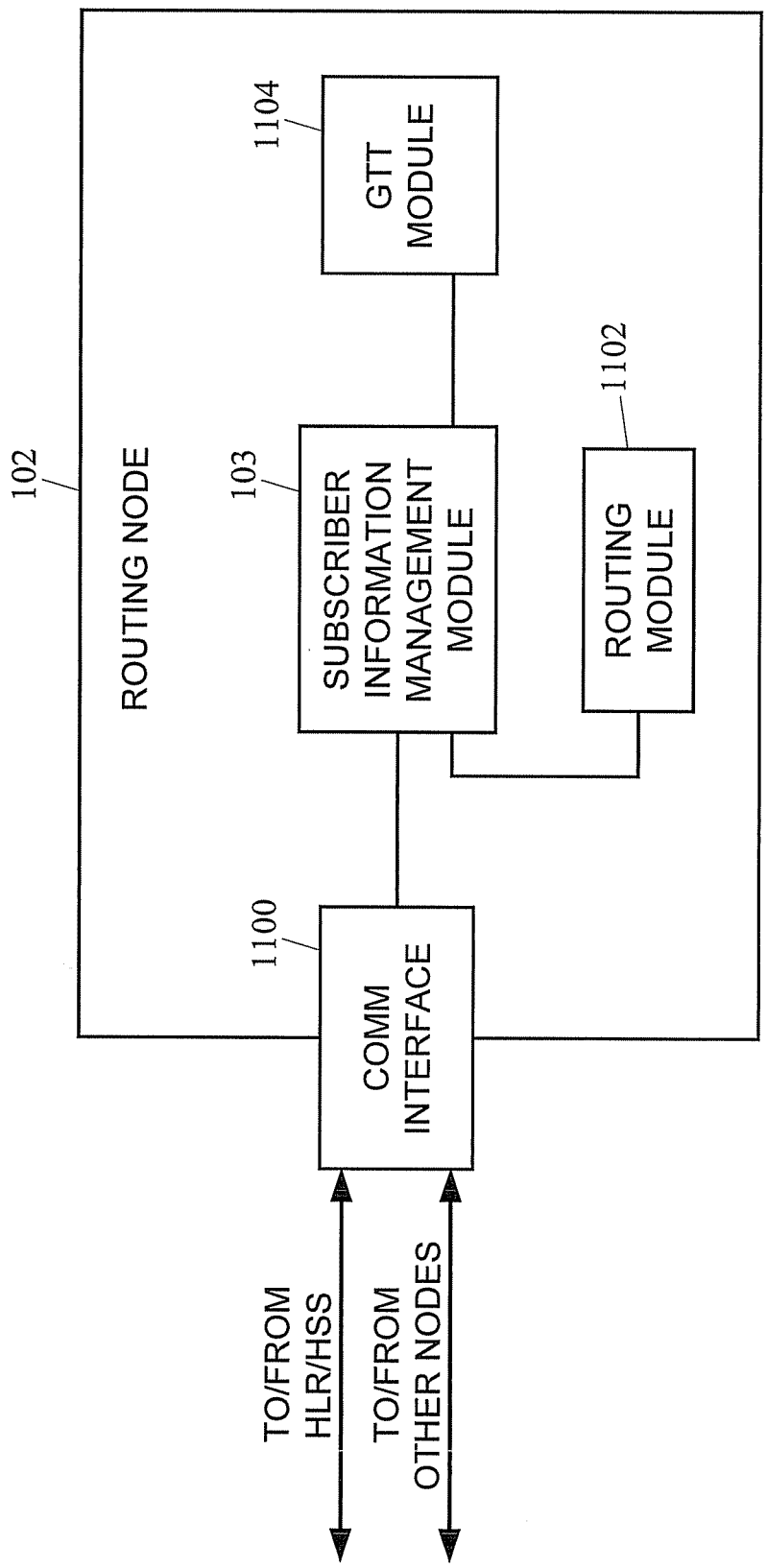
FIG. 11 is a block diagram illustrating a signaling message routing node for providing backup subscriber information management service according to an embodiment of the subject matter described herein.

FIG. 11 is a block diagram illustrating an exemplary routing node for providing backup subscriber information management service according to an embodiment of the subject matter described herein. Referring to FIG. 11, routing node 102 may be an STP, a signaling gateway, an edge router, a SIP signaling router, a Diameter signaling router, an IP router, or an IMS router. Routing node 102 includes subscriber information management module 103 that performs the steps described herein for providing backup subscriber information management service. Routing node 102 may also include a communications interface 1100 that exchanges messages with an HLR or HSS to determine availability or unavailability. Communication interface 1100 may also intercept the subscriber information management messages from other nodes and either route or respond to those messages depending on whether the HLR or HSS is available. Accordingly, routing node 102 may include a routing module 1102 that performs signaling message routing. If routing node 102 is a DSR, routing module 1102 may include Diameter routing information where messages are routed based on Diameter layer information, including any combination of originating host, destination host, originating realm, and destination realm. If routing node 102 operates in an SS7 network, routing module 1102 may route based on any combination of SS7 routing parameters, including destination point code, originating point code, destination IP address, and originating IP address. Because some messages in SS7 networks are sent route on global title, routing node 102 may include a global title translation (GTT) module 1104 that performs global title translation for signaling messages to translate the global title address into a point code and subsystem number that can be routed using routing module 1102.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for using a signaling message routing node to provide backup subscriber information management service, the method comprising:
    obtaining, by a Diameter signaling router (DSR), information associated with a subscriber;
    receiving, at the DSR, a first subscriber information management message including a message destination and being associated with the subscriber;
    determining, at the DSR, whether the message destination is available to process the first subscriber information management message;
    in response to determining that the message destination is available to process the first subscriber information management message, routing, at the DSR, the first subscriber information message to the message destination; and
    in response to determining that the message destination is not available to process the first subscriber information management message, responding, at the DSR, to the first subscriber information management message on behalf of the message destination using the information obtained at the DSR.

2. The method of claim 1 wherein obtaining the information associated with the subscriber comprises:
    receiving, at the signaling message routing node, a second subscriber information management message containing the information associated with the subscriber;
    extracting the information associated with the subscriber from the second subscriber information management message; and
    storing the extracted information associated with the subscriber at the signaling message routing node or at a node that is separate from the DSR and the message destination.

3. The method of claim 2 wherein the first and second subscriber information management messages each comprise one of:
 a mobile application part (MAP) protocol message; and
 a Diameter protocol message.

4. The method of claim 2 wherein the second subscriber information management message comprises a request to update location information for the subscriber.

5. The method of claim 4 wherein the request to update location information for the subscriber comprises one of:
 an update location (UpdateLoc) message;
 a registration message; and
 a Diameter update location request (ULR).

6. The method of claim 1 wherein the information associated with the subscriber comprises information identifying the subscriber.

7. The method of claim 6 wherein the information identifying the subscriber comprises at least one of:
 an international mobile subscriber identity (IMSI); and
 a mobile station integrated services digital network (MSISDN) number.

8. The method of claim 1 wherein the information associated with the subscriber comprises information identifying the network node that currently serves the subscriber.

9. The method of claim 8 wherein the information identifying the network node that currently serves the subscriber comprises at least one of:
 a point code of the network node;
 an Internet protocol address of the network node; and
 a Diameter identity of the network node.

10. The method of claim 8 wherein the network node that currently serves the subscriber comprises at least one of:
 a mobile switching center (MSC);
 a mobile switching center server (MSCS);
 a short message service center (SMSC); and
 a serving call session control function (S-CSCF).

11. The method of claim 1 wherein the message destination comprises at least one of:
 a home location register (HLR); and
 a home subscriber server (HSS).

12. The method of claim 1 wherein determining whether the message destination is available to process the first subscriber information management message comprises at least one of:
 using at least one of a physical level protocol, a link level protocol, a network level protocol, an application level protocol, and a high availability protocol to determine whether the message destination node is available to process the first subscriber information management message; and
 receiving notification from an entity other than the signaling message routing node indicating that the message destination is or is not available to process the subscriber information management message.

13. The method of claim 1 wherein the first subscriber information management message comprises a request for location information for the subscriber.

14. The method of claim 13 wherein the request for location information comprises one of:
 a send routing information (SRI) message;
 a send routing information for short message (SRI_SM) message;
 a location request (LOC_REQ) message; and
 a Diameter location information request.

15. The method of claim 13 wherein responding to the first subscriber information management message on behalf of the message destination comprises providing the location information for the subscriber.

16. The method of claim 1 wherein responding to the first subscriber information management message on behalf of the message destination node comprises at least one of:
 responding to a request for location update with an answer indicating that the location update is allowed; and
 responding to a request for profile information by providing user profile information to the requesting entity.

17. The method of claim 1 wherein the first subscriber information management message comprises a Diameter message sent over a Cx, S6a, S6b, or Sp interface.

18. A system for using a signaling message routing node to provide backup mobility management service, the system comprising:
 a Diameter signaling router (DSR), the DSR including:
  a communications module located within the DSR for receiving a first mobility management message having a message destination and being associated with a subscriber; and
  a subscriber information management module located within the DSR for obtaining information associated with the subscriber, for determining whether the message destination is available to process the first subscriber information management message, for, in response to determining that the message destination is available to process the first subscriber information management message, routing the first subscriber information management message to the message destination, and, in response to determining that the message destination is not available to process the first subscriber information management message, responding to the first subscriber information management message on behalf of the message destination using the information obtained at the DSR.

19. The system of claim 18 wherein obtaining the information associated with the subscriber comprises:
 receiving, at the DSR, a second subscriber information management message containing the information associated with the subscriber;
 extracting the information associated with the subscriber from the second subscriber information management message; and
 storing the extracted information associated with the subscriber at the signaling message routing node or at a node that is separate from the DSR and the message destination.

20. The system of claim 19 wherein the first and second subscriber information management messages each comprise one of:
 a mobile application part (MAP) protocol message; and
 a Diameter protocol message.

21. The system of claim 18 wherein the information associated with the subscriber comprises information identifying the subscriber.

22. The system of claim 21 wherein the information identifying the subscriber comprises at least one of:
 an international mobile subscriber identity (IMSI) of the subscriber; and
 a mobile station integrated services digital network (MSISDN) number of the subscriber.

23. The system of claim 22 wherein the network node that currently serves the subscriber comprises at least one of:
 a mobile switching center (MSC);
 a mobile switching center server (MSCS);

a short message service center (SMSC); and
a serving call session control function (S-CSCF).

24. The system of claim 19 wherein the information associated with the subscriber comprises information identifying the network node that currently serves the subscriber.

25. The system of claim 24 wherein the information identifying the network node that currently serves the subscriber comprises at least one of:
a point code of the network node;
an Internet protocol address of the network node; and
a Diameter identity of the network node.

26. The system of claim 18 wherein the message destination comprises at least one of:
a home location register (HLR); and
a home subscriber server (HSS).

27. The system of claim 18 wherein determining whether the message destination is available to process the first subscriber information management message comprises at least one of:
using at least one of a physical level protocol, a link level protocol, a network level protocol, an application level protocol, and a high availability protocol to determine whether the message destination is available to process the first subscriber information management message; and
receiving notification from an entity other than the signaling message routing node indicating that the message destination is or is not available to process the first subscriber information management message.

28. The system of claim 18 wherein the first subscriber information management message comprises a request for location information for the subscriber.

29. The system of claim 28 wherein the request for location information comprises one of:
a send routing information (SRI) message;
a send routing information for short message (SRI_SM) message;
a location request (LOC_REQ) message; and
a Diameter location information request (LIR) message.

30. The system of claim 28 wherein responding to the first subscriber information management message on behalf of the message destination comprises providing the location information for the subscriber.

31. The system of claim 18 wherein the first subscriber information management message comprises a request to update location information for the subscriber.

32. The system of claim 31 wherein the request to update location information for the subscriber comprises one of:
an update location (UpdateLoc) message;
a registration message; and
a Diameter update location request.

33. The system of claim 18 wherein responding to the first subscriber information management message on behalf of the message destination comprises at least one of:
responding to a request for location update with an answer indicating that the location update is allowed; and
responding to a request for profile information by providing user profile information to the requesting entity.

34. The system of claim 18 wherein the first subscriber information management message comprises a Diameter message sent over a Cx, S6a, S6b, or Sp interface.

35. A non-transitory computer readable medium having stored thereon executable instructions that when executed by a processor of a computer to instruct the computer to perform steps comprising:
obtaining, by a Diameter signaling router (DSR), information associated with a subscriber;
receiving, at the DSR, a first subscriber information management message including a message destination and being associated with the subscriber;
determining, at the DSR, whether the message destination is available to process the first subscriber information management message;
in response to determining that the message destination is available to process the first subscriber information management message, routing, at the DSR, the first subscriber information message to the message destination; and
in response to determining that the message destination is not available to process the first subscriber information management message, responding, at the DSR, to the first subscriber information management message on behalf of the message destination using the information obtained at the DSR.

* * * * *